(12) United States Patent
Ton-That et al.

(10) Patent No.: US 8,077,422 B1
(45) Date of Patent: Dec. 13, 2011

(54) WRITING SPIRALS BASED ON SERVO TRACKS OF A DIFFERENT SAMPLE RATE

(75) Inventors: Luan Ton-That, San Jose, CA (US); Perry Neos, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/192,971

(22) Filed: Aug. 15, 2008

Related U.S. Application Data

(60) Provisional application No. 60/955,930, filed on Aug. 15, 2007.

(51) Int. Cl.
  *G11B 21/02* (2006.01)
  *G11B 5/596* (2006.01)
(52) U.S. Cl. .................. 360/75; 360/77.07
(58) Field of Classification Search .......... None
  See application file for complete search history.

(56) References Cited

U.S. PATENT DOCUMENTS

| | | | |
|---|---|---|---|
| 6,775,091 B1 | 8/2004 | Sutardja | |
| 6,987,636 B1 | 1/2006 | Chue et al. | |
| 6,992,852 B1 | 1/2006 | Ying et al. | |
| 7,002,761 B1 | 2/2006 | Sutardja et al. | |
| 7,019,937 B1 | 3/2006 | Liikanen et al. | |
| 7,068,459 B1 | 6/2006 | Cloke et al. | |
| 7,088,533 B1 | 8/2006 | Shepherd et al. | |
| 7,113,362 B1 | 9/2006 | Lee et al. | |
| 7,167,333 B1 | 1/2007 | Liikanen et al. | |
| 7,209,312 B1 | 4/2007 | Sutardja | |
| 7,248,427 B1 | 7/2007 | Everett et al. | |
| 7,307,807 B1 | 12/2007 | Han et al. | |
| 2007/0195445 A1 | 8/2007 | Vanlaanen et al. | |
| 2007/0211369 A1* | 9/2007 | Yang et al. | 360/75 |
| 2008/0013202 A1* | 1/2008 | Shepherd et al. | 360/75 |
| 2008/0013203 A1* | 1/2008 | McMurtrey | 360/75 |
| 2008/0030889 A1 | 2/2008 | Smith et al. | |

OTHER PUBLICATIONS

U.S. Appl. No. 12/192,931, filed Aug. 15, 2008, as retrieved on Sep. 24, 2009.
U.S. Appl. No. 12/188,118, filed Aug. 7, 2008, as retrieved on Sep. 24, 2009.
U.S. Appl. No. 12/188,118, filed Aug. 7, 2008, Neos et al.

\* cited by examiner

*Primary Examiner* — Andrew L Sniezek

(57) ABSTRACT

Methods, systems and computer program products for launching one or more reference spiral sets using different tracks are described. In some implementations, a method can be used that includes writing a first spiral set starting at a first track and determining a radial offset. Then a second track is determined based on the radial offset. A second spiral set is also written starting at the second track. A spiral set-to-wedge ratio is determined based on a number of spiral sets to be written. Subsequently, servo information can be written using the first spiral set and the second spiral set. The servo information can include one or more sets of servo wedges, which can be written based on the spiral set-to-wedge ratio.

17 Claims, 19 Drawing Sheets

WRITING SPIRALS BASED ON SERVO TRACKS OF A DIFFERENT SAMPLE RATE

CROSS-REFERENCE TO RELATED APPLICATIONS

This application claims priority to U.S. Provisional Application Ser. No. 60/955,930 titled "WRITING SPIRALS BASED ON SERVO TRACKS OF A DIFFERENT SAMPLE RATE," filed on Aug. 15, 2007, the disclosure of which is incorporated herein by reference in its entirety.

TECHNICAL FIELD

The subject matter of this application is generally related to servo systems.

BACKGROUND

In magnetic-medium-based storage devices, data can be stored on circular, concentric tracks on a magnetic disk surface. A read/write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read/write head needs to be precisely positioned at substantially the center of a track during both writing and reading. A closed-loop servo system, driven by servo information embedded in a dedicated portion of the track, can be used as a reference for positioning the head.

The servo information generally defines the position of the data tracks and is generally written with great accuracy to ensure that the head servo system operates properly. The servo information can be written on each surface as a radially extending set of spokes or wedges. The portion of a servo wedge at a particular track location may contain a sync field, index mark, a gray coded track number, and two or more fine-positioned offset bursts configured in an echelon across the track. Head positioning relative to a track center can be determined and corrected, if necessary, by reading and noting the respective amplitudes and timings of the offset bursts.

Conventionally, a servo writer is used to write the embedded servo information on the disk surface. A servo writer can include a large base (e.g., granite base) to minimize the effects of vibration. The servo writer also may use precision fixtures to hold the target drive, a precision laser-interferometer-based actuator arm positioning mechanism to place the arms radially with respect to the axis of rotation of the disks in the drive, and an external clock head to position the servo wedges in time. Conventional servo writers are typically large in size and expensive to be manufactured. Further, as track density increases, the servo writing time required to write the servo information also increases, which can create a bottleneck in the disk drive manufacturing process.

SUMMARY

Methods, systems and computer program products for launching one or more reference spiral sets using different tracks are described. In some implementations, tracks may be separated by a predetermined radial distance, and the predetermined radial distance may be used as a radial offset or a delay needed to write the reference spiral sets at a different track.

In some implementations, a method is provided that includes writing a first spiral set starting at a first track, determining a first radial offset, determining a second track based on the first radial offset, writing a second spiral set starting at the second track, and writing servo information using the first spiral set and the second spiral set. The servo information can include one or more sets of servo wedges.

In some implementations, a method is provided that includes writing a plurality of reference spiral sets each starting at a predetermined track and writing one or more sets of servo wedges using the plurality of reference spiral sets. Writing a plurality of reference spiral sets can include writing the reference spiral sets and the one or more sets of servo wedges at a predetermined ratio.

In some implementations, a method is provided that includes writing a first spiral set starting at a first track, writing a second spiral set starting at a second track different from the first track, and writing servo information using the first spiral set and the second spiral set.

The details of one or more embodiments of the invention are set forth in the accompanying drawings and the description below. Other features, objects, and advantages of the invention will be apparent from the description and drawings, and from the claims.

DETAILED DESCRIPTION

Hard Disk Drive System Overview

Figure 1:
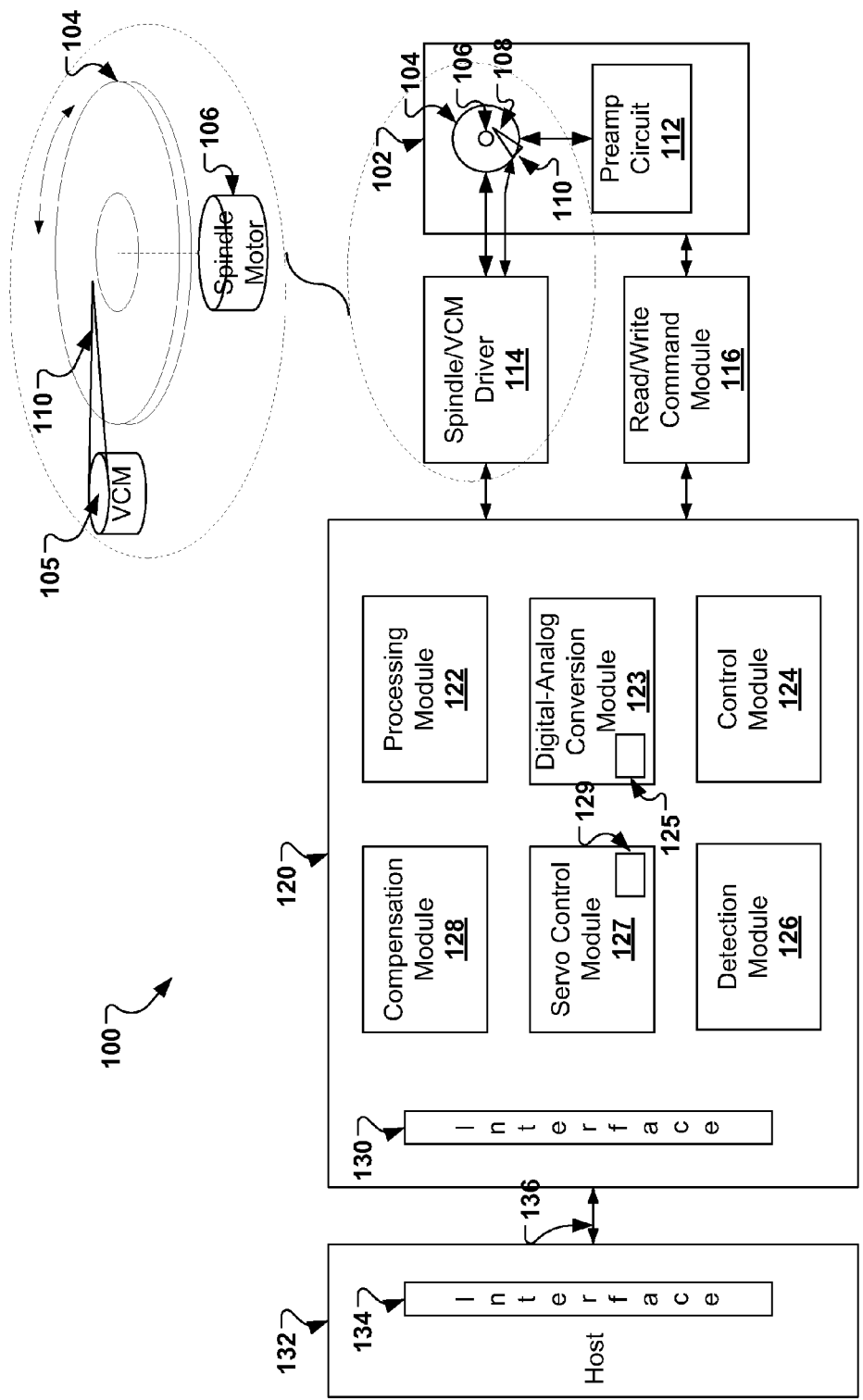
FIG. 1 shows an example hard disk drive (HDD) system.

FIG. 1 shows an example hard disk drive (HDD) system 100. As shown in FIG. 1, the HDD system 100 includes a printed circuit board (PCB) 120. The PCB 120 includes a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 may perform data and/or control processing related to the general operation of the HDD system 100. For example, the processing module 122 may execute instructions received from the control module 124 to control disk drive functions. These functions may include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 may include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code may include instructions the processing module 122 executes or utilizes as well as tables, parameters or arguments used during the execution of these instructions. In some implementations, the processing module 122 also may store various firmware routines for controlling the operation of the spindle motor 106 such as, without limitation, startup routines, speed control routines, spin down routines and parking routines.

The processing module 122 may include registers and buffers for storing, for example, flags indicating whether a spin-up operation has been successfully completed. Alternatively, the flags may be stored in a register defined by a memory location in a memory unit separate from the processing module 122.

In some implementations, the processing module 122 may include a pulse width modulation (PWM) controller (not shown) for generating control signals so as to control the spindle/VCM driver 114 to drive the spindle motor 106 at a substantially constant speed while the disk drive is in use. The spindle/VCM driver 114 may receive VCM control signals from the PWM controller and generate a corresponding command signal to command the VCM 105 for positioning the actuator arm 110 and the read/write head 108, for example, as part of a parking operation. The VCM 105 may be controlled by the servo control module 127, and may be configured to apply torque to the read/write head 108 to swing the read/write head 108 during, for example, a track-seeking operation and to maintain the head 108 at a desired angular position during a track-following operation.

The spindle/VCM driver 114 may, in some implementations, include an electromotive force (EMF) detector (not shown) for detecting a back EMF (BEMF) associated with one or more windings of the spindle motor 106. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor 106. As an example, while the spindle motor 106 is rotating, the EMF detector may detect the BEMF zero crossing point for an un-driven winding to generate a zero crossing signal (e.g., by counting clock pulses and determining time elapsed between the consecutive detected zero crossings). The control module 124 may receive the zero crossing signal and provide information associated with the zero crossing signal to the processing module 122, for example, to compute the velocity of the spindle motor 106.

The control module 124 may function to manage and handle data transfer between the PCB 120 and the host 132 during read and write operations through the communications interfaces 130/134. The control module 124 also may include servo logic for managing the positioning of the read/write head 108 when seeking (e.g., moving from one track to a non-adjacent track) and during tracking (e.g., staying on a single track).

The control module 124 may communicate with the communications interface (e.g., an input/output interface) 130 and with the spindle/VCM driver 114 or the read/write command module 116. The control module 124 may coordinate control of the spindle/VCM driver 114, the read/write command module 116, the processing module 122, the compensation module 128 and the detection module 126.

The control module 124 may receive a command from the host computer 132 to generate a spin-up command while the spindle motor 106 is at rest to begin the spin-up mode of operation. The processing module 122 may receive the spin-up command from the control module 124 and retrieve an associated control routine for the spin-up mode of operation from a memory unit.

During write operations, the read/write command module 116 may encode (e.g., using, run length limited coding (RLL)) data to be written by the read/write head 108 and generate encoded write signals. The read/write command module 116 also may process the write signals providing a reliability check and may apply, for example, error correction coding (ECC) and similar algorithms to allow for the verification of the integrity of the data that is written. During read operations, the read/write head 108 may generate read signals (e.g., analog signals), and the read/write command module 116 may convert the analog read signals into digital read signals. The converted signals may be detected and decoded by conventional techniques to recover data written by the read/write head 108.

Hard Disk Drive Assembly

Signals between the HDD head assembly 102 and the PCB 120 can be carried, for example, through a flexible printed cable. The HDD head assembly 102 may include one or more magnetic disks or platters 104 for storing magnetic data. The platters 104 may be rotated by the spindle motor 106. The spindle motor 106 may rotate the platters 104 at a controlled speed during the read/write operations. The read/write actuator arm 110 may move relative to the platters 104 in order to read and/or write data to/from the platters 104. The spindle/VCM driver 114 may be configured to control the spindle motor 106, which rotates the platters 104. If desired, the spindle/VCM driver 114 also may generate control signals for positioning the read/write actuator arm 110 using the VCM 105, a stepper motor or any other suitable actuator.

The read/write head 108 may be located near a distal end of the read/write actuator arm 110. The read/write head 108 may include a write element (e.g., an inductor) that generates a magnetic field, and a read element (e.g., a magneto-resistive (MR) element) that senses the magnetic field on the platters 104.

The HDD head assembly 102 also may include a preamp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information. During a write operation, the preamp circuit 112 also may provide write current via a write data signal to a selected transducer for writing a sequence of symbols onto the platters 104. The write current changes polarity upon each change in the binary value of the write data signal.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the HDD system 100 other than the HDD head assembly 102 may be implemented as a system-on-chip.

In general, the spindle motor 106 may have different power requirements based on different operational configurations. For example, initial acceleration (e.g., during spin-up process) of the spindle motor 106 may require a high value of current relative to operation at steady-state velocity. As the spindle motor 106 reaches a desired operating velocity, the average motor current requirement may decrease substantially to maintain the head at a desired track.

Servo Control Module

Information may be stored on each platter 104 in concentric tracks. Data tracks may be divided into sectors. Information may be written to and/or read from a storage surface(s) of a disk by the read/write head 108. The read/write head 108 may be mounted on the actuator arm 110 capable of moving the read/write head 108, e.g., radially over the platter 104. The movement of the actuator arm 110 may allow the read/write head 108 to access different data tracks. The platters 104 may be rotated by the spindle motor 106 at a relatively high speed. The read/write head 108 may access different sectors within each track on the platter 104.

Operation of the actuator arm 110 may be controlled by the servo control module 127. The servo control module 127 may move the read/write head 108 according to two primary operations: seek control operation and track following operation.

In a seek control operation, the servo control module 127 controls the actuator arm 110 such that the read/write head 108 may be transitioned from an initial position to a target track position for which the host 132 has requested. A seek control operation generally includes accelerating, decelerating and settling the VCM 105 at a predetermined speed. In general, the servo control module 127 may initiate a seek control operation when the host 132 issues, for example, a seek command to read data from or write data to a target track on the platters 104.

As the read/write head 108 approaches a target track, the servo control module 127 may settle the actuator arm 110. During settling, the servo control module 127 may bring the head 108 to rest over a target track within a selected settle threshold or window, which may be based on a percentage of the track width from the center of the track. The servo control module 127 may employ, for example, a pre-loaded algorithm, to ensure that the head 108 is positioned on the target track with sufficient accuracy to write (and read). This process may require counting servo position samples occurring within the settle window. For example, a write operation may be initiated after observing one or more consecutive positioning samples that are within certain area of a data track. Of course, a wide variety of settle criteria may be employed, in ensuring positioning accuracy.

After the head 108 is settled over a desired track, the servo control module 127 may initiate a track following mode. In the track following mode, the head 108 may be positioned and maintained at a desired position with respect to the target track (e.g., over a centerline of the track) or over a defined radial location along a track on the disk until desired data transfers are complete and another seek is performed, as will be discussed in further detail below.

The digital-analog conversion module 123, which includes a digital-analog converter 125, can operate to convert data between the digital form used by the PCB 120 and the analog form conducted through the head 108 in the HDD head assembly 102. The HDD head assembly 102 can provide servo position information read by the head 108 to the servo control module 127. Servo sectors on each of the platters 104 can include head location information, such as a track identification field and data block address, for identifying a target track and data block, and burst fields to provide servo fine location information. The head location information read by the head 108 may be converted from analog signals to digital data by the digital-analog converter 125, and fed to the servo control module 127. The servo positional information can be used to detect the location of the head 108 in relation to a target track or target data sectors on the platters 104. The servo control module 127 may utilize, for example, target data sectors and servo position information to precisely place the head 108 over the target track and data sector on the platters 104, and to continuously maintain the head 108 aligned with the target track while data is written/read to/from one or more identified data sectors.

The digital-analog conversion module 123 may include a digital-analog converter (DAC) 125 for converting control signals (e.g., for controlling the position of the head 108) generated by the control module 124 into analog signals (and from analog signals into digital data). For example, a head position signal may be generated by the control module 124 and provided to the DAC 125. The DAC 125 then may convert the head position signal into an analog signal (e.g., a voltage signal) for driving the VCM 105 coupled to the actuator arm 110. The actuator arm 110 may subsequently move the head 108 along the surface of the platters 104 based on the analog signal provided by the DAC 125.

In some implementations, the DAC 125 may be configured to output, for example, different analog voltage ranges to account for resolution needs at different operating conditions. In these implementations, the DAC 125 may have one or more selectable modes. For example, the DAC 125 may utilize certain modes (i.e., referred to here as "higher modes") to provide a larger voltage range and bigger current scale but at a lower resolution (volts/digital count). In these implementations, higher modes may be used, for example, during seeking control operations where a large voltage range is generally desirable. Conversely, the DAC 125 may employ other modes (i.e., referred to here as "lower modes") to provide a higher resolution (e.g., smaller voltage steps per digital count). Lower modes may be used, for example, for tracking following operations where high resolution is critical to servo tracking performance.

Servo Controller and Self-Servo-Writing Controller

In some implementations, the servo control module 127 may include a servo controller 129 to control mechanical operations related to servo processing, such as, but not limited to, head positioning (e.g., through the HDD head assembly 102) and rotational speed control (e.g., through the VCM 105). The servo controller 129 may include one or more IC chips (e.g., a combo chip), which can include read/write channel signal processing circuitry 170. The servo controller 129 also may include a microprocessor and a hard disk controller. The drive electronics hosting the controller 129 also may include various interfaces, such as a host-bus interface, and memory devices, such as a read only memory (ROM) for use by a microprocessor, and a random access memory (RAM) for use by the controller 129.

In some implementations, the servo controller 129 may be a self-servo-write controller that manages servo information and how these servo information are to be written on a machine-readable medium. The servo controller 129, in these implementations, may be integrated into a device, such as the read/write head 108. In other implementations, the self-servo controller 129 may be integrated into the processing module 122, the control module 124, the preamp circuit 112, or combinations thereof (e.g., in implementations where the processing and control modules 122 and 124 and the preamp circuit 112 may be combined into a single integrated circuit).

Servo Wedge

In some implementations, servo information on a platter may be written as a plurality of servo wedges 202 that extend radially from an inner diameter (ID) of the platter to an outer diameter (OD) of the platter. The servo wedges 202 may be equally spaced about the circumference of the platter surface.

A servo wedge 202 may include servo patterns written thereon. Servo patterns contained in each servo wedge may be read by the read/write head 108 as the disk surface passes under/over the read/write head 108. The servo patterns may include information identifying a data field. For example, the servo pattern may include, without limitation, a sync field, a servo address mark, track identification (e.g., gray coded track number), an index, offset bursts and the like.

In some implementations, additional information such as partial or complete wedge number information also may be included in the servo patterns. In some implementations, the read/write head 108 may be enabled to write the servo patterns (including additional information) prior to, subsequent to, or contemporaneously with writing servo patterns on some or all of the remaining regions of the platter.

In sum, servo patterns may provide the HDD 100 with head position control information to control the actuator arm 110 to move the head 108 from starting tracks to destination tracks during random access track seeking operations. Further, the servo patterns may provide the HDD 100 with head position control information to control the actuator arm 110 to position and maintain the head 108 in proper alignment with a track during track following operations when user data is read from or written to data sectors in the concentric tracks on the disk surface.

Figure 2:
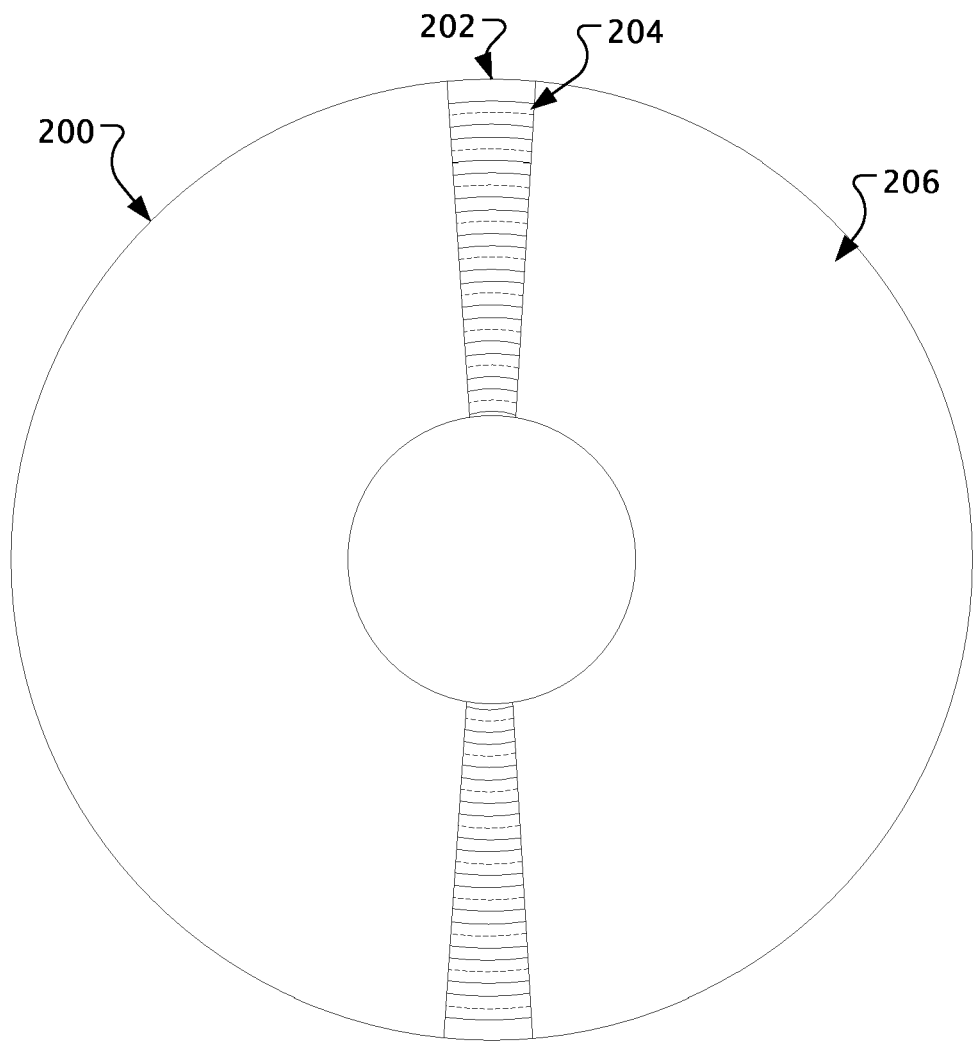
FIG. 2 shows an example disk having servo information written thereon.

FIG. 2 shows an example disk 200 having servo information written thereon. Referring to FIG. 2, a disk 200 with a plurality of servo wedges 202 are shown. The servo wedges 202 may be interspersed between a corresponding number of wedge-shaped data regions or data wedges 206. For sake of brevity and simplicity, only two servo wedges 202 are shown. However, one skilled in the art would readily understand that there can be more than two servo wedges (e.g., from 90 to 100 servo wedges).

Generally, servo information may be written in the form of a plurality of servo sectors 204. The servo sectors 204 may precede a corresponding number of data wedges 206 used to record data tracks. Data tracks may be divided into a plurality of data sectors, and may be formatted in radial zones. Radial zones radiating outwardly from the ID to OD can be written at progressively increased data frequencies to take advantage of an increase in linear velocity of the disk surface directly under the read/write head 108 in the respective radial zones. The servo wedges 202, in some implementations, may not extend linearly from the ID to the OD, but may be curved slightly (e.g., in a form of a spiral) in order to adjust for the trajectory of the read/write head 108 as the head 108 sweeps across the disk 200.

The servo control module 127 may use the servo wedges 202 to read or write servo information as well as data tracks. In some implementations, the servo control module 127 may use one or more spirals to write the servo information, as will be discussed in greater detail below.

In some implementations, before performing a read/write operation on a section of a given track, the read/write head 108 may lock onto a desired track by referring to positioning information contained in a given servo wedge 202. By writing the servo wedges 202 onto a disk, the servo wedges 202 provide the positioning information necessary to allow the read/write head 108 to read and write data at the correct locations on the disk. In this instance, data can be correctly read and/or written if servo information is written properly and precisely.

As briefly discussed in the Background, servo information may be pre-recorded on a disk using servo writers. A servo writer can include a high precision encoder and a mechanical pushpin. The movement of the mechanical pushpin (which is attached to an actuator arm) is controlled by the high precision encoder and other internal hard drive components. The servo writer controls the position of the head in the radial direction of the disk by the mechanical pushpin, and writes a reference servo signal of the disk. Conventional servo writers, however, are expensive in cost, slow in speed and large in size, all of which can contribute to an increase in the overall cost of manufacturing HDDs. These conventional servo writers further become less compatible with the current industrial needs as the requirement for high recording density, compact size and large storage capacity of the hard disk drive becomes more stringent.

Self Servo Writing Overview

In some implementations, a self-servo-writing process may be utilized for writing servo information instead of using external servo writing applications or devices such as servo writers. In some implementations, the self-servo-writing process may include first writing reference information (e.g., reference spirals) on a disk and writing servo information on the disks by referring to the reference information previously written. More specifically, the reference information may include a reference servo sector. When writing servo information using the self-servo-writing process, the read/write head 108 may be locked onto the reference servo sector. The reference servo sector may be written as reference spirals (e.g., a servo sector written in the form of a spiral shape), and servo information may subsequently be written by referring to the reference spirals (e.g., by extracting position control information from the reference spirals).

Figure 3:
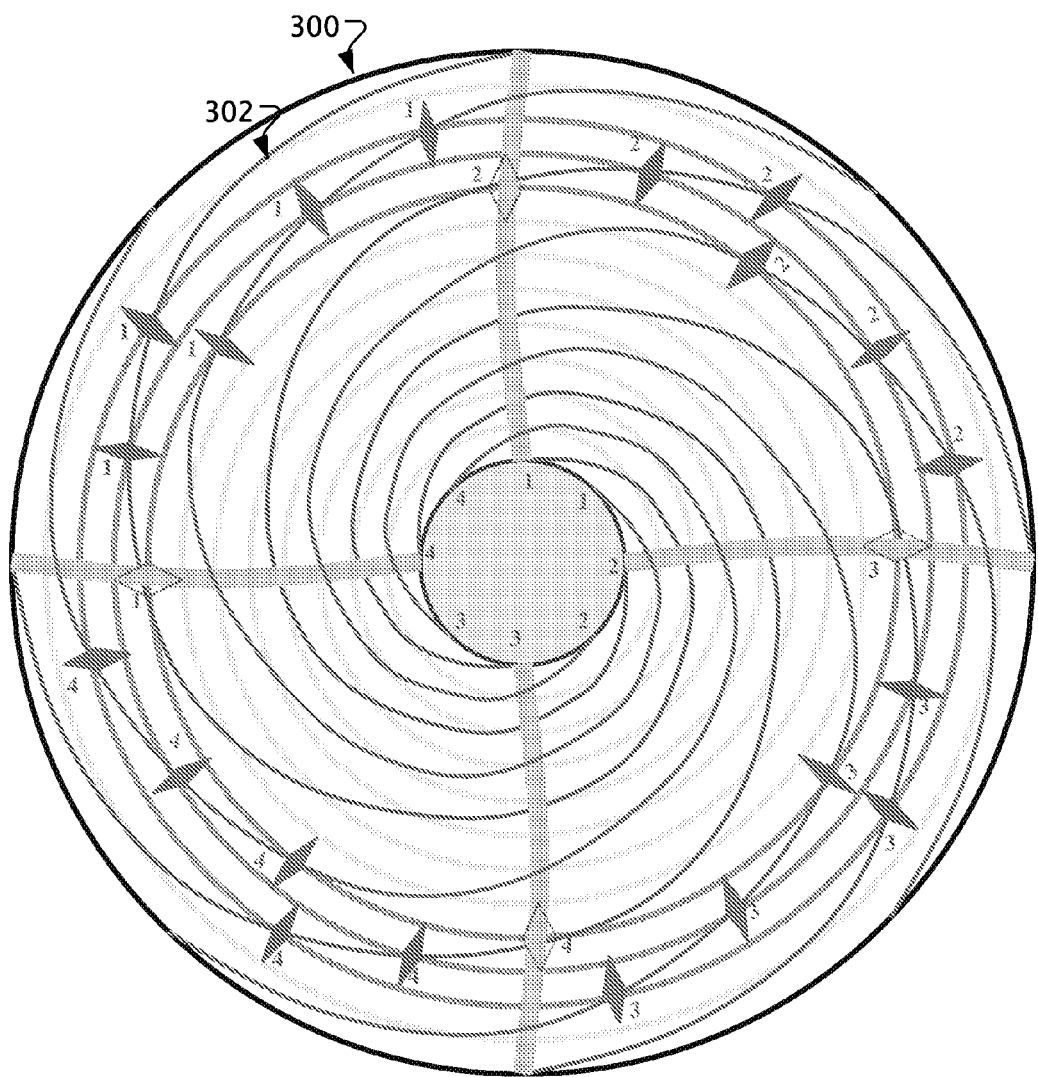
FIG. 3 shows an example of spiral patterns on a reference disk.

FIG. 3 shows an example of spiral patterns of a reference spiral on a reference disk 300. As shown, the disk 300 includes a reference spiral 302. In some implementations, the reference spirals may be crash-stop spiral patterns. Crash-stop spiral patterns may help define the mechanical limits of the actuator arm 110 so that the arm 110 does not move beyond its limits which could damage both the disk 300 and the HDD 100. The reference spirals may each extend (e.g., in segments) from substantially the ID to substantially the OD of the reference disk 300. In some implementations, the reference spirals may all be read by the read/write head 108 at a constant radius during a single revolution of the reference disk 300.

The HDD 100 may use one of the reference spirals, for example, during a self-scan process to servo the read/write head 108 for self-servo writing servo wedges. In some implementations, the HDD 100 may lock onto a reference spiral using conventional position detection techniques, slew to a starting point of the reference spiral, write a portion of servo information in the servo wedges, seek a new track, and write the next portion of servo information in the servo wedges. The reference spiral 302 also may be used (e.g., during track following operations) to assist in identifying the relative position of the read/write head 108 as the disk 300 rotates under the head 108. In some implementations, residual adjustment (e.g., associated with positioning the read/write head 108) can be accumulated and performed across many tracks while the self-servo writing proceeds.

Generally, a self-servo-writing process includes one or more reading and writing operations. Servo information, which is used in the read/write operations of the user data, may be written onto the entire surface of the platter. Written servo information may further be used to write additional servo information, as will be discussed in greater detail below.

In some implementations, during a self-servo-writing process, the read element of the head 108 reads out written servo information from a servo wedge closer to the ID while the write element of the head 108 writes new servo patterns closer to the OD. More specifically, the read element may lock onto a reference spiral while the write element writes new servo information after, for example, obtaining timing and position information from the reference spiral. Servo information may be written onto the entire surface of the disk by moving the head 108 radially between the ID and the OD.

The read element of the head 108 may be located closer to the ID of the platter than the write element. Since writing servo information may start from a position closer to the ID, the read element may sequentially lock onto a reference spiral, read out, for example, position control information from the reference spiral, locate a region on the track for which servo information is to be written, and subsequently write the servo information using the write element. The circumferential positions of the read and write elements are not limited, and that the self-servo-writing process also may begin from the OD of the platter by, for example, using read/write heads with different read/write element lateral offset.

Example of a Self Servo Writing Process

FIGS. 4A-4F show an example self-servo-writing process for writing reference spirals and servo information. To initiate a self-servo-writing process, the actuator arm 110 may be accelerated to a target radial velocity. The reference spirals may then be written while maintaining the target radial velocity.

Generally, a first band of reference spirals may first be written. The first band of reference spirals may assist in writing one or more servo wedges each including servo information having, for example, servo timing information for providing relative circumferential and radial position control information for the read/write head 108. The first band of reference spirals also may be used to provide position and timing reference information for self-servo-writing of a section or portion of the servo wedges. The servo wedges written in this manner may cover a specific radial range.

Another band of reference spirals may be written, with the starting radius located, for example, on one of the written servo patterns (i.e., to serve as the bootstrapped position). This second band of reference spirals may then be used to extend the already-written servo information further (i.e., to write a second portion of the servo wedges) toward the outer diameter of the disk. This process, in some implementations, may be continued until the whole disk is written with all necessary final servo information in the servo wedges. Several bands of spiral patterns may be required.

Figure 4A:
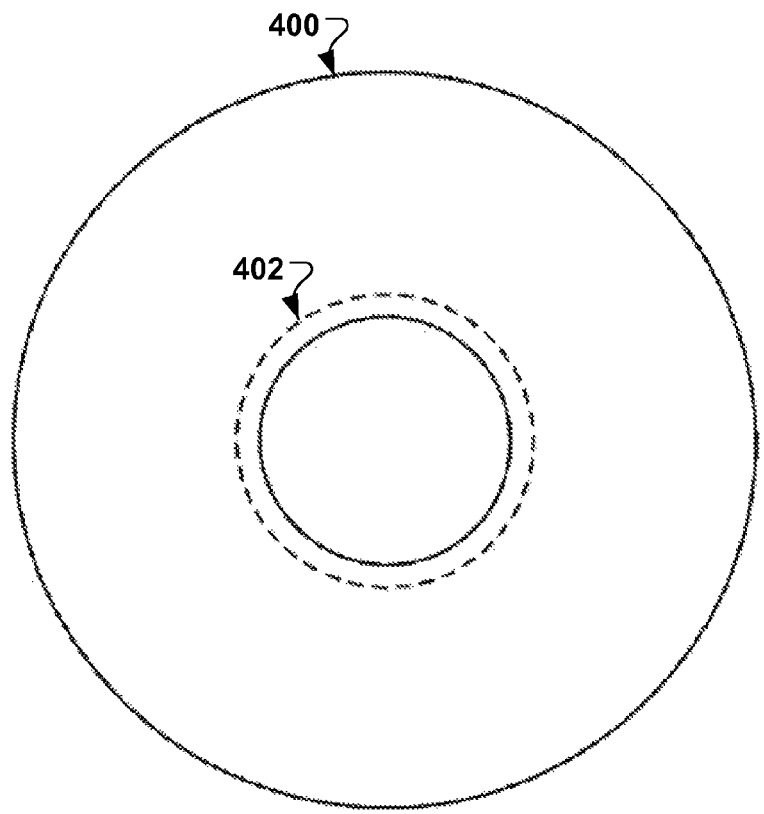
FIGS. 4A-4G show an example self-servo-writing process for writing spiral patterns and final servo information.

Referring to FIG. 4A, in some implementations, a timing track 402 may be written on a platter 400. The timing track may contain a timing reference to facilitate the initial placement of the read/write head 108. In some implementations, the write operation of the timing track may be optional and may be bypassed depending on the specific design and application.

Figure 4B:
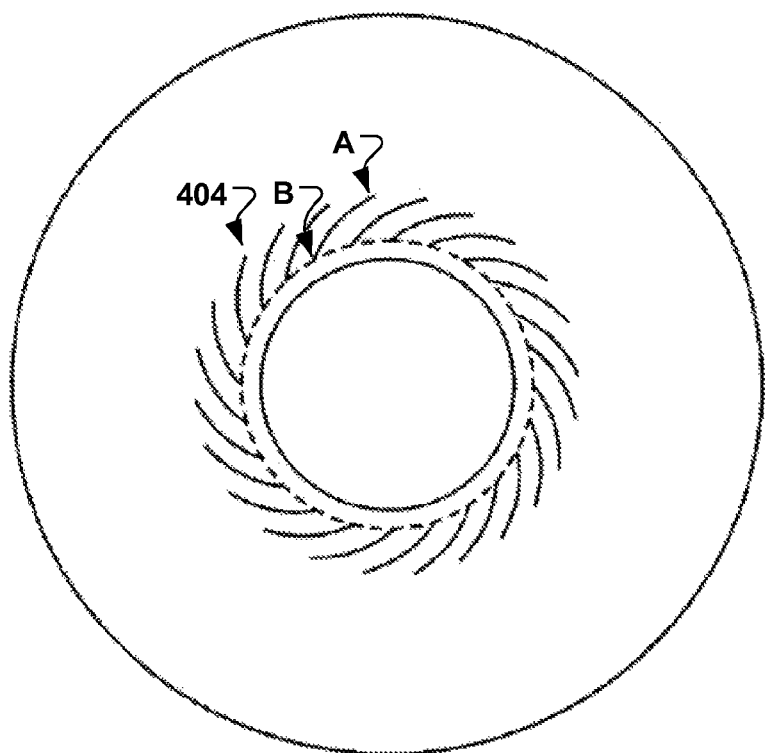

After writing the timing track 402, a first band of reference spirals 404 may be written on the platter 400 extending from the timing track 402, as shown in FIG. 4B. In implementations where the timing track 402 is omitted, the first band of reference spirals 404 may be written on the platter 400 starting from the ID of the platter 400.

Figure 4C:
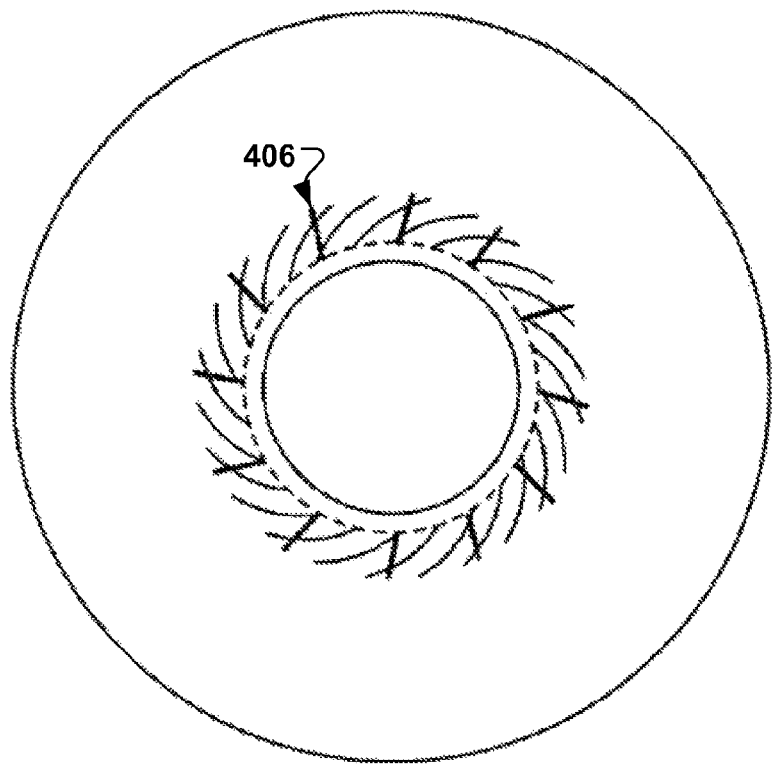
Figure 4D:
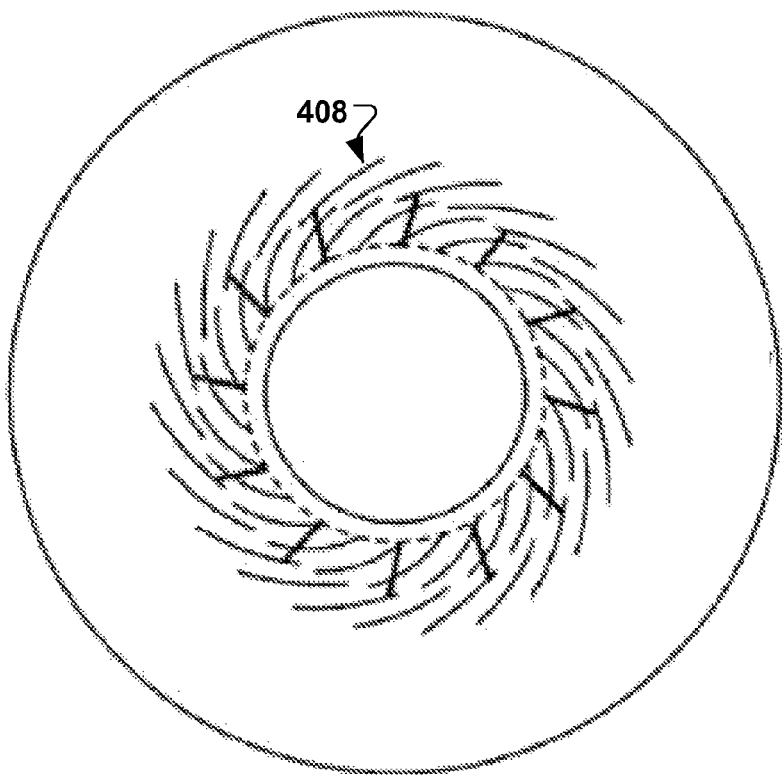
Figure 4E:
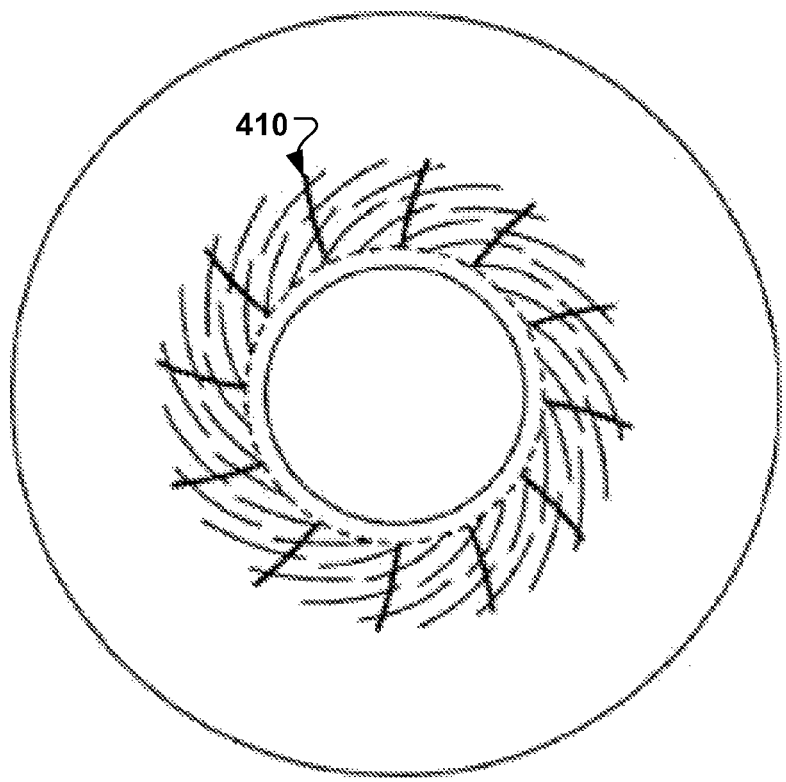
Figure 4F:
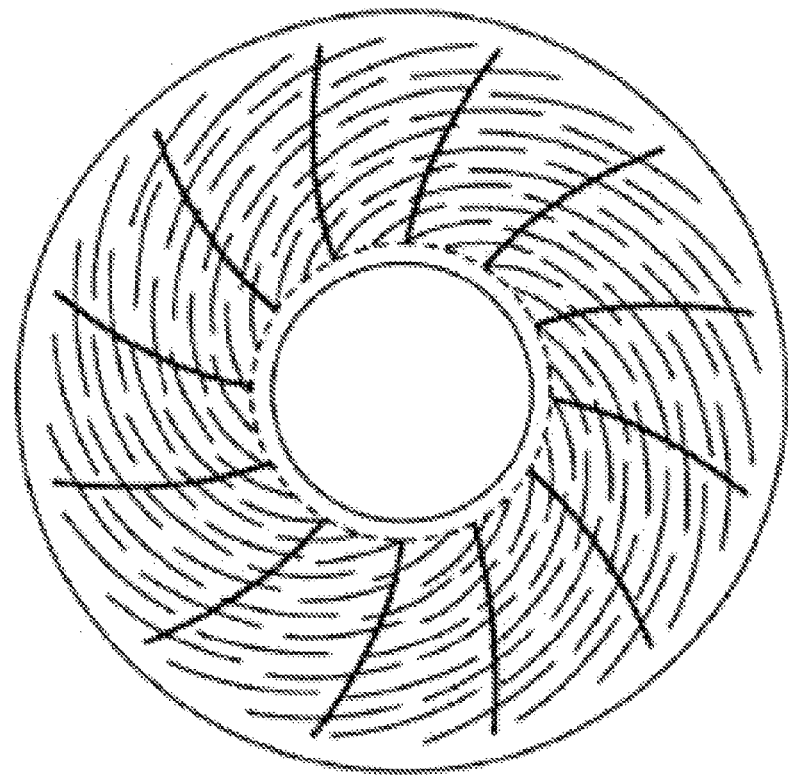

Once the first band of reference spirals 404 is written, a first portion of the servo information 406 including servo wedges may be written using, for example, the timing and position control information provided by the first band of reference spirals as a reference, as shown in FIG. 4C. Thereafter, further servo information may be written using the first portion of the servo information. In other words, the general self-servo-writing process may include, iteratively, writing a next band (e.g., a second band) of reference spirals using a previously-written portion (e.g., a first portion) of the servo information as a reference, and writing a next portion (e.g., a second portion) of the servo information using a previously-written band (e.g., the second band) of reference spirals as a reference. For example, as shown in FIG. 4D, a second band of reference spirals 408 may be written (e.g., in an overlapped and staggered fashion). FIG. 4E shows a second portion 410 of the servo information including servo wedges being written on the platter 400. FIG. 4F shows the disk 400 with all the reference spirals and servo information being written thereon.

As shown in FIGS. 4A-4F, each band of reference spirals ("spiral band") need not extend all the way to the other edge of the disk. For example, each spiral band may span less than half, less than third, less than fourth, or less than eighth of a distance from the ID to the OD of the disk. In some implementations, the span of a spiral band may be less than or equal to one thousand final servo tracks, less than or equal to one hundred final servo tracks, or in the range of three to ninety final servo tracks.

Detecting the End of a Spiral Band

Figure 4G:
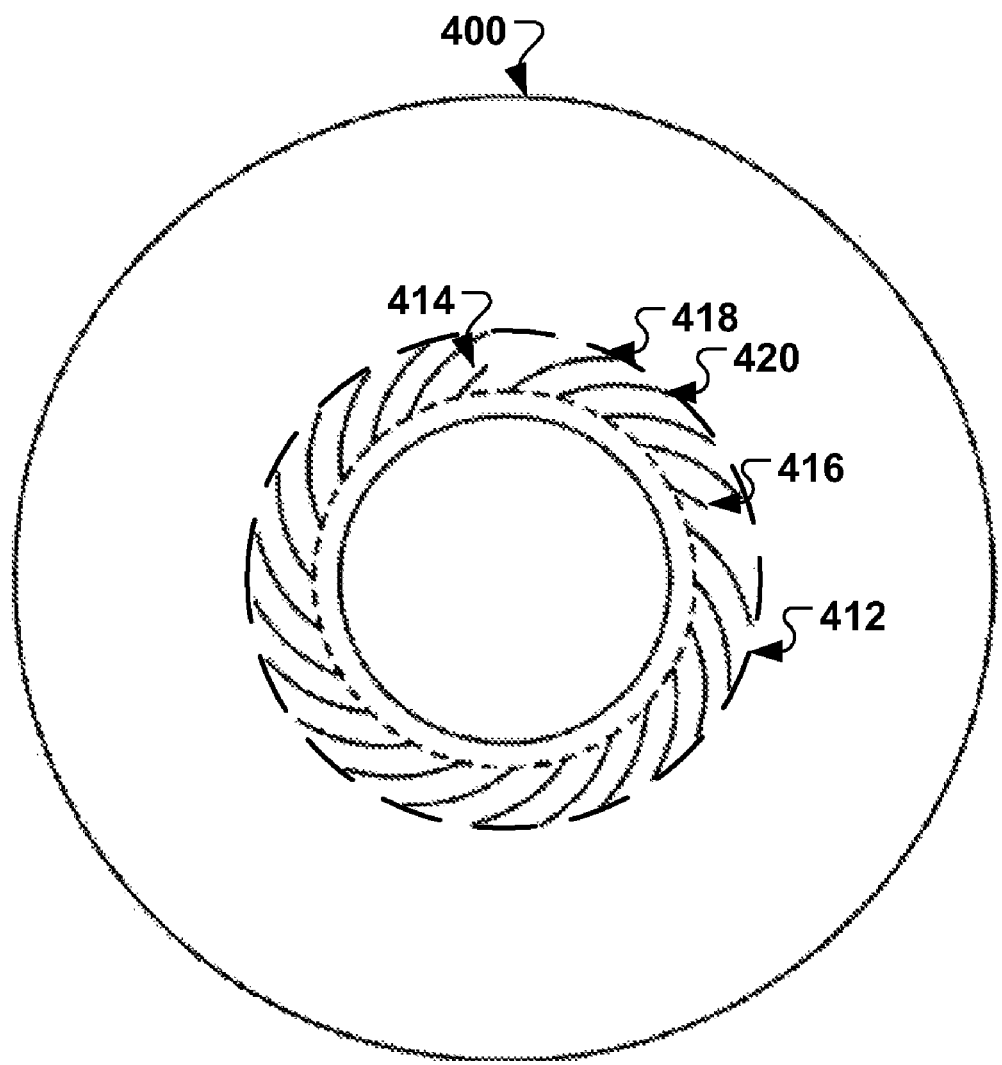

Performing a self-servo-writing process may include writing and reading reference spirals using a non-overlapping approach or an overlapping approach. In a non-overlapping approach, servo information may be written beyond the end of the first spiral band. Specifically, the read/write head 108 may track follow on a first spiral band while writing a portion of the servo information until the end of the first spiral band has been reached. For example, temporarily referring to FIG. 4G, a band of reference spirals 412 may be written on the platter 400. Based on the written servo information, a second spiral band of reference spirals may be launched (e.g., continuing from or substantially near the first spiral band). The read/write head 108 can use the second spiral band to write a next portion of the servo information (e.g., continuing from the previously-written portion) until the end of the second spiral band has been detected.

By precisely detecting the terminal end (e.g., the radial location) of each spiral band and continually writing a next spiral band beginning from the terminal end, the self-servo-writing process ensures that extraneous writings, which may cover overlapping information, and the writing time associated with the extraneous writing are minimized.

Repeatable Runout

Disturbance during spiral writing can lead to position errors. For example, disturbances such as dimension changes in the actuator arm and disk can affect the accuracy of the written reference spirals. These dimension changes may affect the relative geometry between the disk and the actuator to thereby distort the spiral shape away from that desired.

To reduce the effect of such changes, in some implementations, servo information may be written based on the written reference spirals. Because reference spirals may be used to write final servo information, in these implementations, repeatable runout associated with the reference spirals may be measured before writing any portion of the servo information. Then, position correction values may be used while tracking, and may be modified on a regular basis or updated at every track. This may be accomplished, for example, by taking advantage of the high degree of correlation in the repetitive runout in the neighboring tracks so that less processing time is used.

In some implementations, once the read head track follows spiral servo information, initial values for position correction values may be obtained by gathering data over one or more revolutions of the disk. Additional data also may be gathered to characterize the servo system. Calculation, application and verification of the characterization may be performed for a given track over which the read head track follows.

Once the repeatable runout has been accounted for, servo information may be written onto a platter by the write head. To switch to a new track while servoing on the reference spirals, a seek operation may be performed. While a seek operation is being performed, track ID values and a servo pattern associated with a next track may be determined and loaded into a write buffer. Timing corrections also may be applied since spiral timing may have changed due to disk movement in a radial direction. Finally, the track ID values and the servo information may be written to the platter with respect to a particular track.

Position correction values may be updated, while tracking following reference spirals from a new radial location. Because the repeatable runout is generally correlated from track to track, it may not be necessary to gather completely new position correction values while tracking following for many revolutions. A seek operation may be performed again to move to the following radial location and the updated position correction values may be used to reduce the repeatable runout before writing the servo information at this location.

When servoing on reference spirals to write servo information, the time of writing servo information may coincide with the time of reading information from the reference spirals. Timing clash may occur because the spirals shift in time relative to the servo patterns that are being written as the read/write head 108 moves from track to track. Timing clash may occur even through the write head and the read head may be physically offset. Thus, in some implementations, two separate sets of reference spirals may be written with respect to the number of servo wedges in the servo information. For example, if the servo information is to include 250 servo wedges, then substantially 500 reference spirals may be written on a disk. In these implementations, the reference spirals may be grouped into two distinct sets in the same band, where adjacent spirals may be, for example, in different sets.

While writing servo information onto the platter surface, the read head may servo on one of the two sets of spirals. Before a timing clash point, the read head may switch to servoing on the other set of reference spirals so as to avoid the timing clash.

In some implementations, the same number of reference spirals and servo wedges may be written. In some implementations, the self-servo writing process may alternate between reading and writing at every other spiral.

Spiral Slope and Starting Track

When reference spirals are written without velocity control, the velocity of the actuator arm 110 may change from spiral to spiral due to, for example, variations in mechanics of the actuator arm, the spindle, etc. In these instances, the actuator arm 110 may be accelerated to a target velocity, after which a bias current may be supplied to maintain the actuator arm 110 at the target velocity. The bias current may be determined such that it provides approximately zero net acceleration at a given radius, track or spiral. The read/write head 108 may write spiral patterns while the actuator arm 110 quickly accelerates and subsequently continues to move at the target velocity.

Figure 5A:
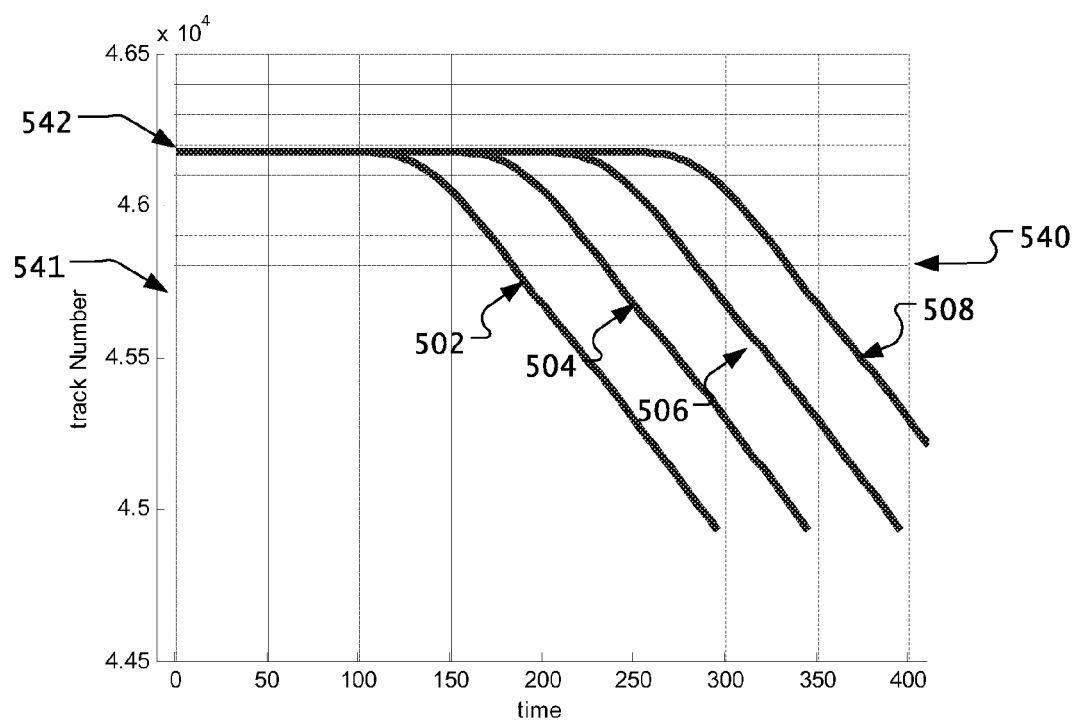
FIG. 5A shows a spiral set having spirals launched from a same track and with a constant slope.

Since the actuator arm 110 accelerates to the target velocity, the read/write head 108 may begin writing spirals having constant spiral slope. FIG. 5A shows a reference spiral set having reference spirals launched from a same track and having a constant slope.

As shown in FIG. 5A, reference spiral 502 may first be launched from a track (e.g., at a track 542 near the track number 46,200) at the zero time unit mark and a write gate may be turned on at a same or different track (e.g., at a track 541 near the track number 45,700). Reference spiral 504 may be launched at the $50^{th}$ unit time unit mark and started to write from the same track as reference spiral 502. Reference spiral 506 may be launched at the $100^{th}$ time unit mark and started to write from the same track as reference spiral 502 and reference spiral 504. Reference spiral 508 may be launched at the $150^{th}$ time unit mark and started to write from the same track as reference spiral 502, reference spiral 504 and reference spiral 506.

In some implementations, a small number of tracks may be disposed between a start writing track (e.g., track 540) and a last servo track (e.g., track 541). In some implementations, a small number of tracks may be used to establish an overlap region which may be used to change between servoing on wedges and servoing using reference spirals. Toward the OD direction (e.g., toward the bottom on FIG. 5A), a blank media area may be formed. For example, tracks at track numbers 45,500, 45,000 and 44,500 may be blank (e.g., have not been written).

By controlling the constant velocity of the actuator arm 110, the slope of the reference spirals in a reference spiral set may be controlled with higher accuracy. For example, reference spirals 502-508 each have a constant slope as well as equal spacing from other reference spirals. As an example, reference spiral 502 may have a same spiral slope as that of reference spiral 504, reference spiral 506, and reference spiral

508. As another example, reference spiral 502 and reference spiral 504 may be separated by the same spacing as that between reference spiral 506 and reference spiral 508. In general, writing reference spirals with a constant velocity is ideal because constant velocity yields consistent servo writing. In some implementations, a constant velocity of 20 tracks per sample may be achieved in, for example, 150-250 time units. Of course, the same constant velocity also may be achieved in a greater or lesser number of time units depending on the specific application and design.

Figure 5B:
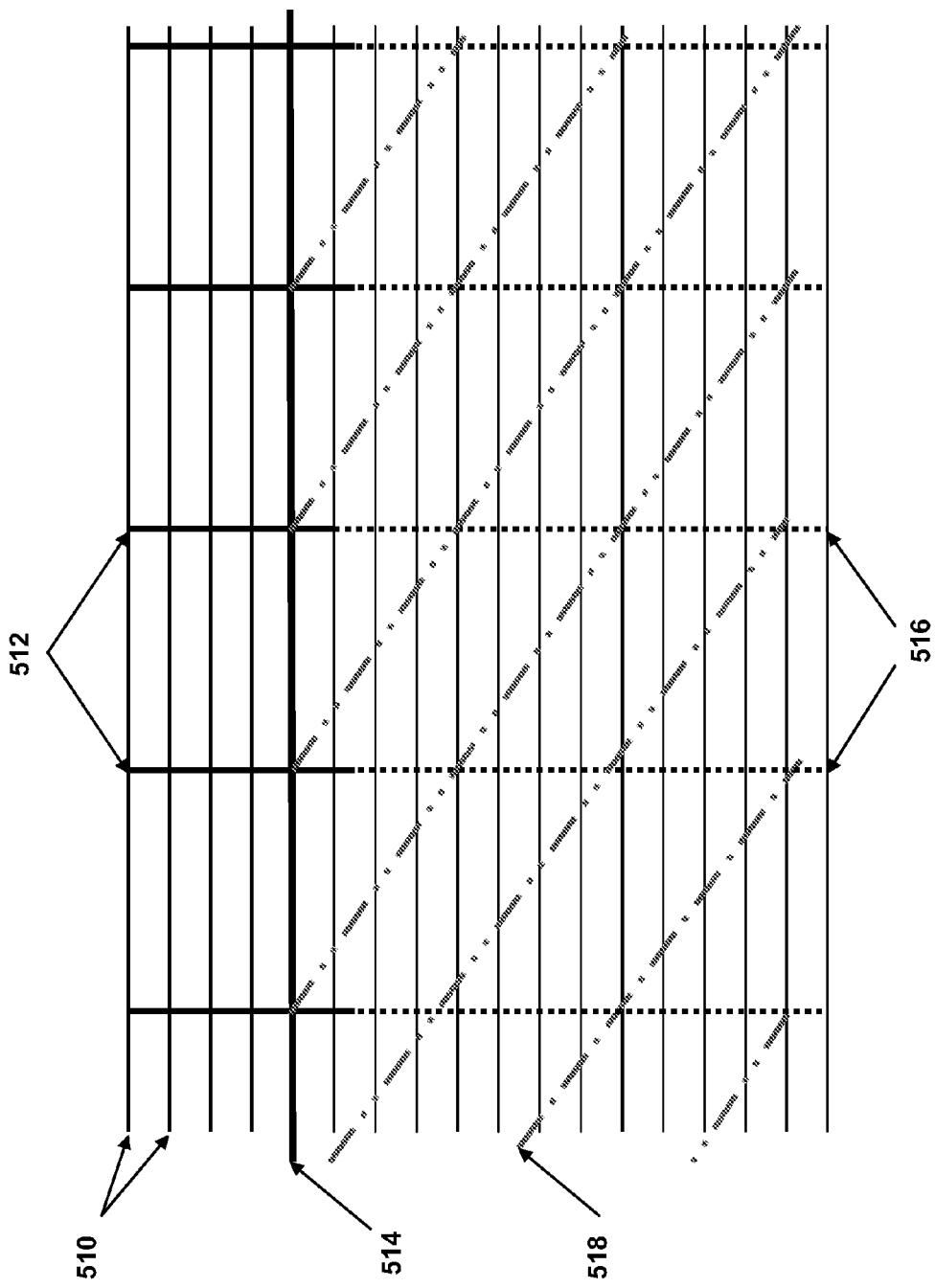
FIG. 5B shows an expanded view of the spiral set shown in FIG. 5A along with servo wedges written in relation to the spiral set.

FIG. 5B shows an expanded view of the reference spiral set shown in FIG. 5A along with servo wedges written in relation to the reference spiral set. Reference numeral 510 indicates tracks that have already been written; reference numeral 514 denotes the last "final track" written by the read/write head 108; and reference numeral 516 denotes servo wedges that have yet to be written.

As discussed previously, a reference spiral set (or multiple reference spiral sets) may be launched at or near the end of the previous band of reference spirals. As shown in FIG. 5B, the reference spiral set 518 may be launched beginning at the last track written (e.g., track 514).

In some implementations, the beginning of the last track written and the end of a previous band may be at a same location. In some implementations, an overlap region may be used to describe this location (see FIG. 7A and as will be discussed in greater detail below). In some implementations, the overlap region may include one or more tracks (e.g., 20 tracks) where the reference spirals and the wedges may co-exist. As discussed above, the overlap region may be used to switch between servoing on wedges and servoing on reference spirals. For example, as wedges are written (e.g., at spiral band "C"), wedges may be served using a track of the previous band (e.g., at spiral band "B"). The read/write head may then seek out the overlap region between these two bands (spiral band "B" and spiral band "C"), switch to servoing using reference spirals to move to a region without wedges, and start to write wedges at this location (e.g., a region that may be blank and may contain a portion having reference spirals written thereon).

When writing servo information, the read/write head 108 may switch from spiral to spiral within the same band until, for example, either all servo wedges have been written, or when the end of the new band of reference spirals has been reached.

In some implementations, the reference spiral set 518 may be written at a same sample rate as the servo wedges 512. The sample rate may indicate a number of servo samples required for a track to keep the read/write head 108 sufficiently on-track. For example, if a servo sample rate of 400 equally-spaced servo wedges is to be written, then 400 equally-spaced spirals also would be written. As another example, using the example shown in FIG. 5B, five reference spirals (which may be a part of a single reference spiral that swirls across various tracks, or alternatively, may be multiple spirals intersecting various tracks) and five servo wedges may be written onto a single disk. In this example, each reference spiral in the reference spiral set 518 may use a single but different servo wedge as a reference point (e.g., for timing references) for writing a next portion of the servo information. In some implementations, the number of reference spirals 518 and the number of servo wedges 512 may have the same count (i.e., at a one-to-one ratio).

Figure 5C:
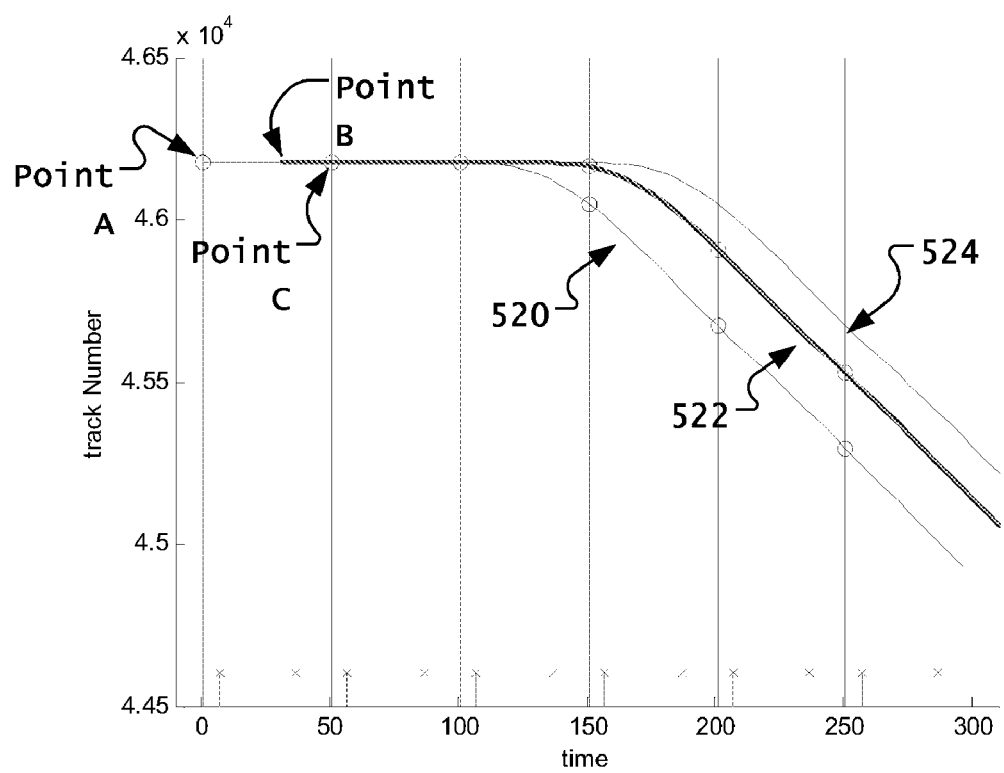
FIG. 5C shows an example spiral being written with a delay.

In some implementations, the reference spirals in the reference spiral set 518 may be written at a different sample rate as the servo wedges 512. For example, the number of reference spirals 518 and the number of servo wedges 512 on a disk may have a different count. As an example, two reference spiral sets and one set of servo wedges may be written (i.e., at a two-to-one ratio). In some implementations, to write reference spirals of a different sample rate, a delay may be incorporated into the writing of each reference spiral. FIG. 5C shows an example reference spiral being written with a delay.

As shown in FIG. 5C, an additional reference spiral 522 may be added between reference spirals 520 and 524. Specifically, the writing of reference spiral 522 may be delayed such that it may be written at point B (e.g., at a midpoint between the zero time unit mark and the $50^{th}$ time unit mark). By incorporating a delay into the writing of reference spiral 524, the number of reference spirals may be increased. For example, multiple reference spirals may be written from a same track (e.g., from a track between the $46000^{th}$ track and $45500^{th}$ track) and launched between the zero time unit mark and the $50^{th}$ time unit mark, each of which being launched at a different time unit mark (e.g., spiral A is launched at the $0^{th}$ time unit mark, spiral B is launched at the $25^{th}$ time unit mark, spiral C is launched at the $50^{th}$ time unit mark, etc.). If delay is achieved by delaying the control current, servo instability may result, particularly during a seek operation. By delaying the control current to write the reference spiral 522, the model parameters used to generate the design parameters may be different from those used for the reference spiral 520 which is written without the added delay. This difference may result in the trajectories of reference spiral 520 and reference spiral 522 having different characteristics, which can ultimately prevent reference spiral 522 from moving at a velocity close to that used for reference spiral 520.

Thus, in some implementations, where two reference spiral sets (e.g., per wedge to wedge) are used, one of the reference spiral sets may be launched from a track different from that used to launch the other reference spiral set. For example, spiral set A may be launched from a first track while spiral set B may be launched from a second track different from the first track.

In some implementations, the reference spirals associated with the two reference spiral sets may be interleaved. For example, assuming there are 200 reference spirals of which 100 reference spirals are grouped into the reference spiral set 702 while the remaining 100 reference spirals are grouped into the reference spiral set 704, the read/write head 108 may track follow using a portion or all of the reference spirals of a given reference spiral set (e.g., all 100 reference spirals over one revolution, each reference spiral giving the position control information at a particular instant). Although only one of the two reference spiral sets is used for track following (e.g., to allow the position of the head 108 to be determined, and position corrections to be applied to the head 108 so that the head 108 may stay on a target position to avoid undesirable drift), the other reference spiral set also may be considered (e.g., by collecting magnitude information associated with the other spiral set).

Figure 6A:
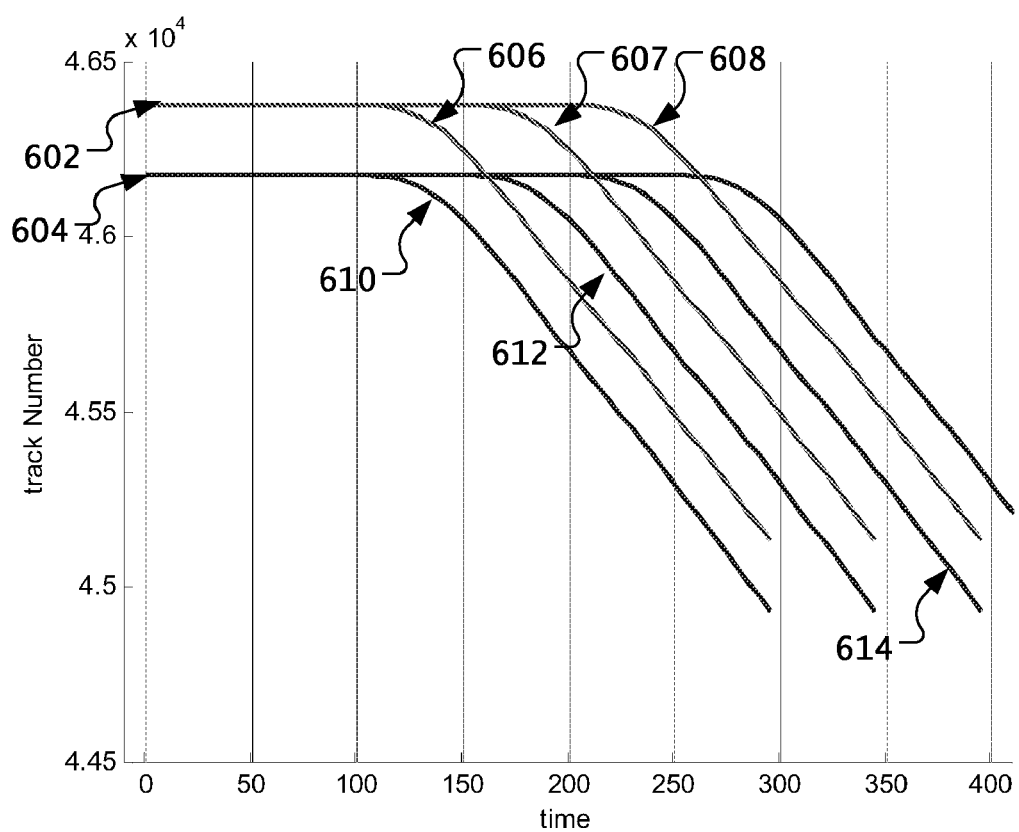
FIG. 6A shows a spiral-to-servo-wedge mapping with a two-to-one ratio.

FIG. 6A shows a spiral-to-servo-wedge mapping with a two-to-one ratio, where the two reference spiral sets may each be launched from a different track. Referring to FIG. 6A, the first reference spiral set 602 may be launched at a track different from that from which reference spiral set 604 is launched. For example, the first reference spiral set 602 may be launched from the $46400^{th}$ track while the second reference spiral set 604 may be launched from the $46200^{th}$ track. Because tracks are generally separated by a predetermined radial distance, the predetermined radial distance may be used as a radial offset to translate into a delay needed to write different numbers of reference spiral sets. For example, if the desired velocity to write a given reference spiral is 20 tracks per sample, then the launch position may be offset between the second reference spiral set 604 and the first reference spiral set 602 by 10 tracks, which may be half of the target velocity multiplied by the sample time so as to achieve two equal distance sets of reference spirals (e.g., one reference spiral set includes reference spiral 610, reference spiral 612 and reference spiral 614, and the other reference spiral set includes reference spiral 606, reference spiral 607 and reference spiral 608).

In some implementations, equal distance may be referenced with respect to an angle or time. For example, in FIG. 6A, if a horizontal line is drawn starting from track 45500 (or any point where the write gate is turned ON), the horizontal line would sequentially intersect reference spirals 610, 606, 612, 607, 614, 608 at points or locations which are equally distributed.

As shown in FIG. 6A, with a constant velocity, each of the first reference spiral set 602 and the second reference spiral set 604 can be written with a similar constant spiral slope. In the example shown, although the first reference spiral set 602 and the second reference spiral set 604 are launched from a different track, the first reference spiral set 602 can still achieve the same objectives provided in FIG. 5C (e.g., more reference spirals may be written between servo wedges) but without the delay drawbacks. For example, reference spiral 606 of the first reference spiral set 602 may be written between reference spiral 610 and reference spiral 612 of the second reference spiral set 604. As another example, reference spiral 607 may be written between reference spiral 612 and reference spiral 614 of the second reference spiral set 604.

Generally, at any given track, correctly placed spirals exhibit an exact spiral-to-spiral spacing between reference spiral sets. The correct spacing may then be utilized to position the actuator arm 110 and to write a next set of reference spirals or servo information. Spacing error of the spiral-to-spiral spacing between reference spiral sets around the revolution, or spiral runout, can result in the degradation of drive position error while seeking or track following. If the spiral spacing error is extreme, the drive may fail to self-write. Thus, while minor variation in spirals spacing may be acceptable and corrected by runout compensation techniques, large variation can cause performance problems such as collision between processing time of two adjacent spirals that can result in a loss of spiral control. In one example, spacing variation more than 15% can result in a loss of spiral control.

Thus, in some implementations, the spiral-to-spiral spacing between the reference spiral sets may be adjusted by selecting suitable tracks from which the reference spirals of both reference spiral sets are to be launched. For example, if the spacing between reference spiral 610 of the second reference spiral set 604 and reference spiral 606 of the first reference spiral set 602 is to be written wider, then the first reference spiral set 602 may be launched from a track (e.g., one closer to the OD) farther from that used to launch the second reference spiral set 604. As another example, if the spacing between reference spiral 610 of the second reference spiral set 604 and reference spiral 606 of the first reference spiral set 602 is to be written closer, then the first reference spiral set 602 may be launched from a track (e.g., one closer to the ID) closer to that used to launch the second reference spiral set 604.

While FIG. 6A shows that the first reference spiral set 602 and the second reference spiral set 604 are separated by a distance of about 200 tracks (e.g., from a track at or near track number 46400$^{th}$ to track number 46200$^{th}$), the first reference spiral set 602 and the second reference spiral set 604 also may be separated by a greater (e.g., 400 tracks) or lesser distance (e.g., 20 tracks).

Figure 6B:
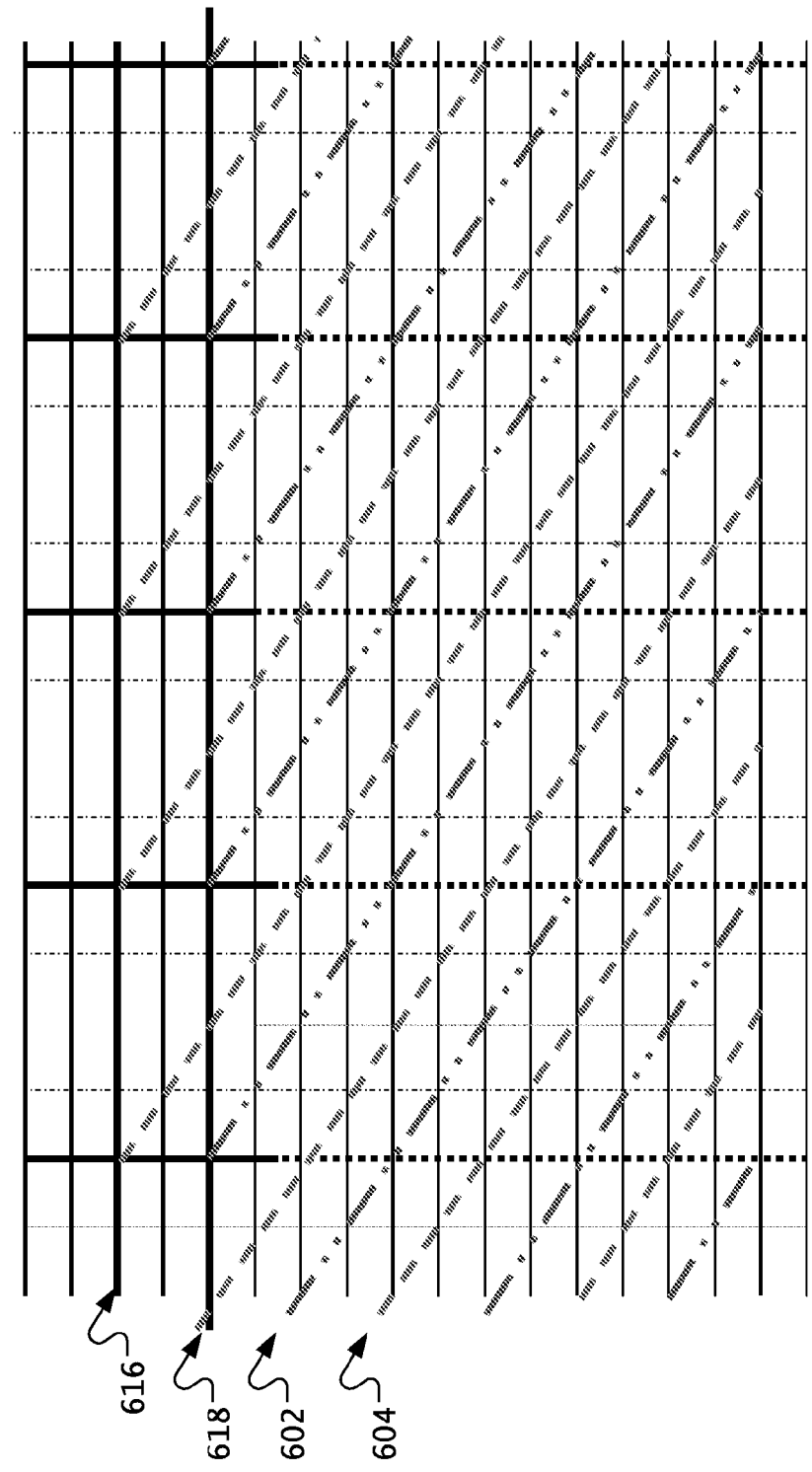
FIG. 6B shows an expanded view of a first spiral set and a second spiral set shown in FIG. 6A.

FIG. 6B shows an expanded view of the first reference spiral set 602 and the second reference spiral set 604 shown in FIG. 6A. Referring to FIG. 6B, the first reference spiral set 602 and second reference spiral set 604 may be launched from different tracks. More specifically, the second reference spiral set 604 may be launched from track 616, whereas the first reference spiral set 602 may be launched from track 618.

In some implementations, the offset with respect to the launching track 618 and launching track 616 may be determined by a spiral velocity and a sample time, the result of which may be divided by the number of spirals per wedge as may be given as [1]:

$$\text{Starting\_track offset} = (\text{sample Time}) * (\text{spiral velocity}) / (\text{number of spirals per wedge}) \quad [1]$$

For example, as shown in FIG. 6B, the second reference spiral set 604 is written between two wedges, which indicates that there are two spirals per wedge. If the spiral velocity (e.g., the radial velocity during the time at which the write gate is turned ON) is 20 tracks per sample, then the starting track offset may be ten tracks (i.e., 20/2). That is, if one set of reference spirals is launched at track number 46200, the other reference spiral set may be launched at track number 46210 (or track 46190).

In some implementations, the spiral velocity may be the velocity associated with the read/write head (e.g., the rate at which the head is moving) in a radial direction while a spiral is written. Using the foregoing example, a spiral velocity of 20 tracks per sample may indicate that the read/write head is traveling an equivalent distance of 20 tracks that it takes for the HDD to rotate from a given wedge to an adjacent one (e.g., wedge to wedge time). Thus, temporarily referring to FIG. 5B, the wedge-to-wedge time may be time it takes for the HDD to rotate by an angle equal to 360 divided by the number of wedges.

Figure 7A:
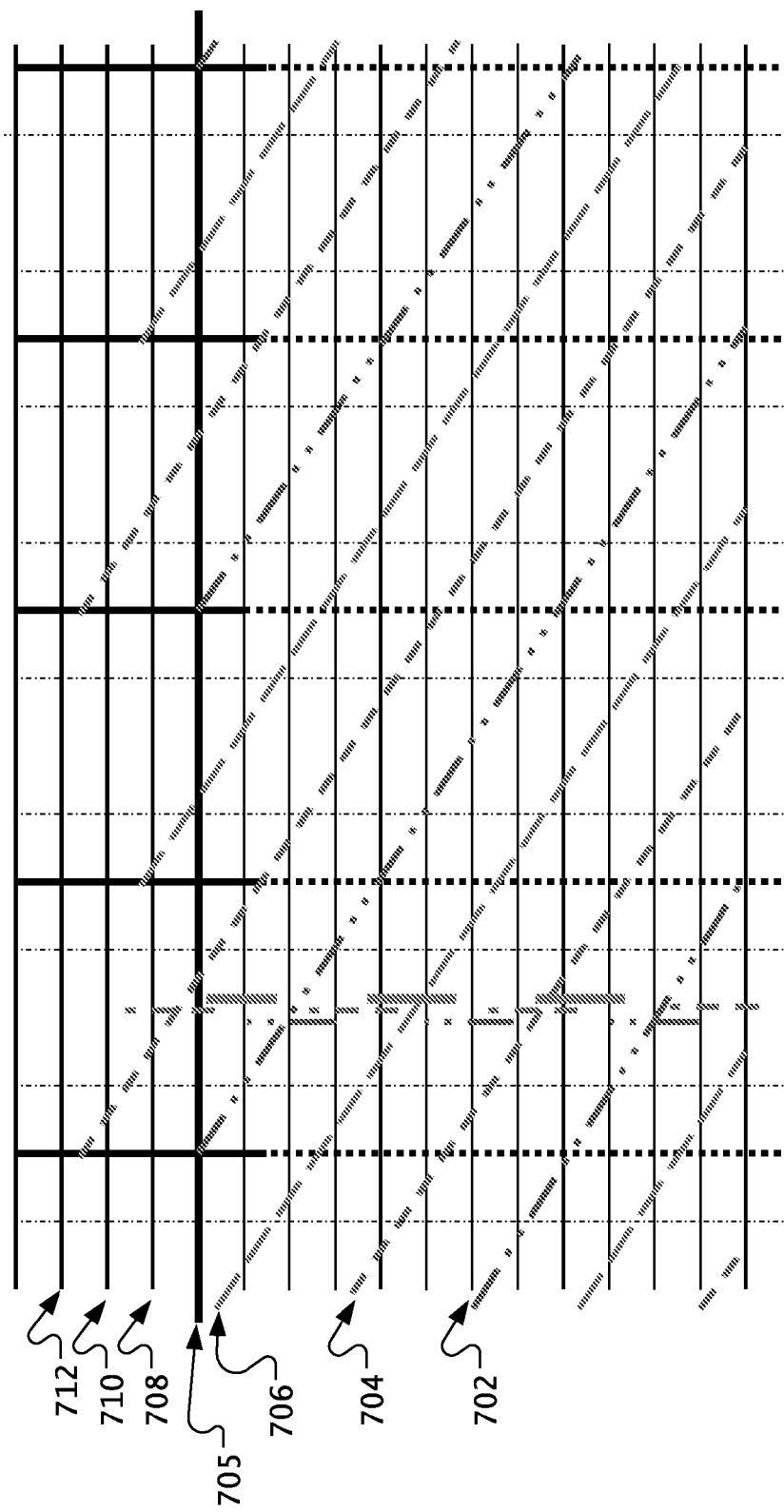
FIG. 7A shows a spiral-to-servo-wedge mapping with a three-to-two ratio.

FIG. 7A shows a spiral-to-servo-wedge mapping with a three-to-two ratio (e.g., three reference spirals in a space of two wedge-to-wedge distance). FIG. 7A is similar to FIG. 6B, except that FIG. 7A includes a third reference spiral set 706. Reference spirals of the third reference spiral set 706 may all be launched from a same track, as in the case for the first reference spiral set 702 and the second reference spiral set 704 (e.g., reference spirals of the first reference spiral set 702 may all be launched from track 705 and reference spirals of the second reference spiral set 704 may all be launched from a track between track 710 and track 712). In some implementations, the launch may take place not at a full track, but from a track plus a predetermined fraction (e.g., at track number 42000.3 as opposed to track number 42000). As may be given in equation [1], the division may result in a non-integer. The non-integer may then be used to provide the fraction to accurately determine the location of the launch.

In some implementations, the track from which a reference spiral set may be launched may be determined by using equation [1]. Specifically, the divisor in equation [1] (the number of spirals per wedge) may be given as 3/2 (e.g., three spirals per every two wedges), which provides a starting track offset of 2*(spiral velocity)/3.

In some implementations, the mapping shown in FIG. 6B may utilize a same sample rate to determine the normal wedge servo and spiral servo, while the mapping shown in FIG. 7A may use a different sample rate to perform the normal wedge servo and spiral servo. By doing so, in cases where the number of spirals may be less than 2*(number of wedges), less reference spirals may be written to avoid over-crowding.

As an example, if the first reference spiral set 702 is launched with a spiral velocity of six tracks/sample, then the track from which the second reference spiral set 704 is to be launched is from the $4^{th}$ track (i.e., separated by 1/3*six tracks), and the track from which the third reference spiral set 706 is to be launched is from the $2^{nd}$ track (i.e., 2 tracks from the second reference spiral set 704). In some implementations, the reference spiral sets may be switched so that the second reference spiral set 704 may start from the $2^{nd}$ track while the third reference spiral set 706 may start from the $4^{th}$ track.

Figure 7B:
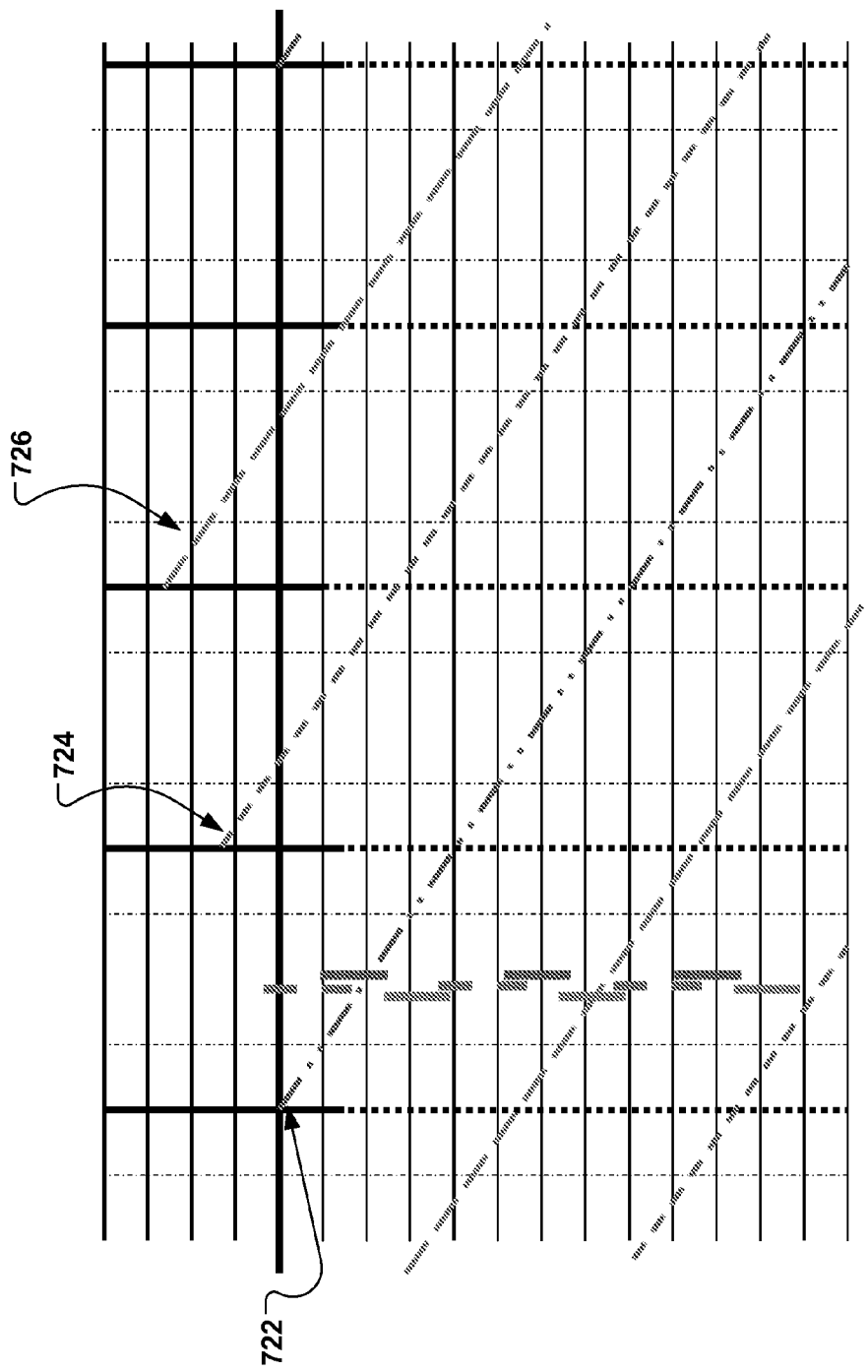
FIG. 7B shows a spiral-to-servo-wedge mapping with a three-to-four ratio.

FIG. 7B shows a spiral-to-servo-wedge mapping with a three-to-four ratio. Unlike the previous examples, less spirals are being written than servo wedges in FIG. 7B. In such an implementation, the starting track from which a reference spiral set may be launched may be viewed in a manner similar to a spiral-to-servo-wedge mapping with a three-to-two ratio. Specifically, the spiral velocity from the first reference spiral set to the second reference spiral set would be 1/3 and from the first reference spiral set to the third reference spiral set would be 2/3.

In some implementations, the starting track location of the reference spirals as shown in FIG. 7A (showing three spirals in a two wedge-to-wedge distance format) and those shown in FIG. 7B (showing three spirals in a four wedge-to-wedge distance format) may be the same. In some implementations, the spiral velocity may be determined as six tracks such that the starting locations for each of the three spirals may be launched at track "0" (or track "6"), at track "2" and track "4".

Figure 8:
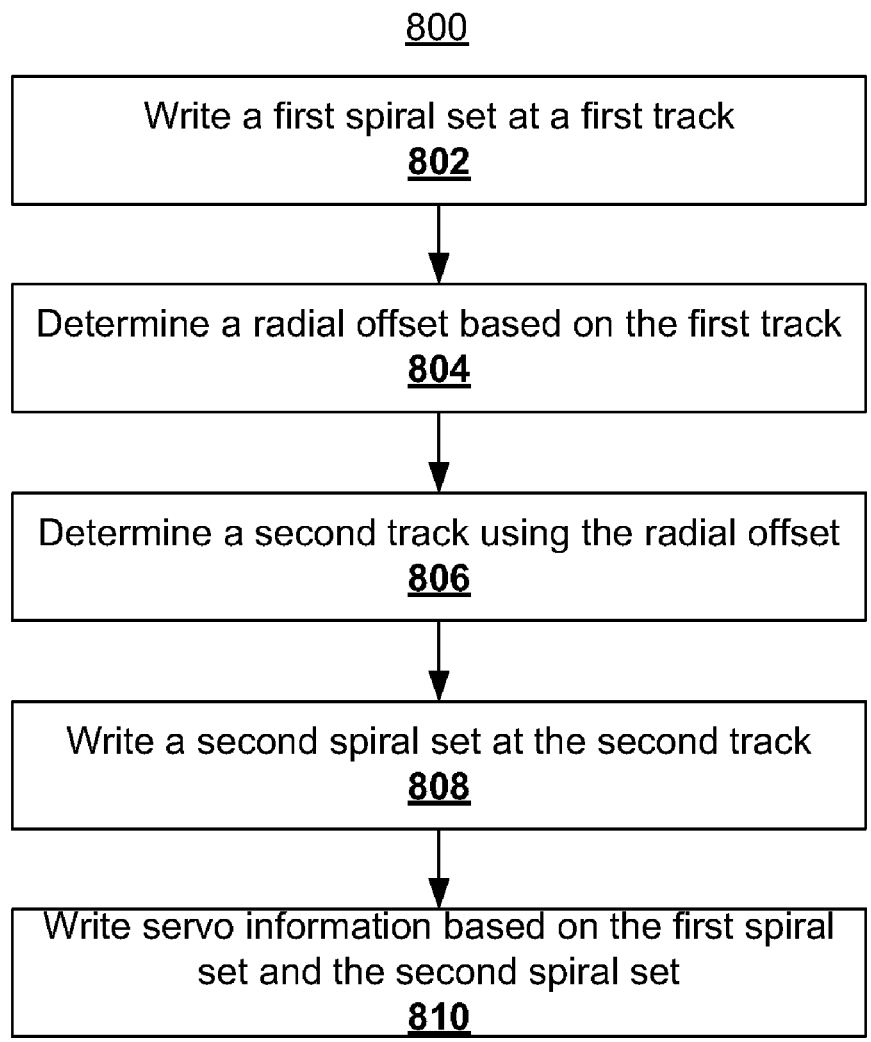
FIG. 8 is an example process for writing servo information using multiple spiral sets.

FIG. 8 is an example process 800 for writing servo information using multiple spiral sets. Process 800 may be performed, for example, by the HDD system 100, and for clarity of presentation, the description that follows uses the HDD system 100 as the basis of examples for describing the process 800. However, another apparatus, system, or combination of systems, may be used to perform the process 800.

Referring to FIG. 8, process 800 begins with writing a first spiral set at a first track (802). In some implementations, the first spiral set may be used to provide the position and timing reference for self-servo-writing of the first portion of servo information. In some implementations, all reference spirals are written prior to performing servo writing (e.g., so as to use position control information from the spirals as feedback to write servo information). The servo information written in this manner may cover a specific radial range.

Then, a radial offset using the first track may be determined (804). In some implementations, the radial offset may indicate a number of tracks separating the first track and a different track (e.g., a second track).

Next, a second track from the radial offset is determined (806). In some implementations, determining a second track using the radial offset may also include determining a second track using the radial offset and information associated with the first track. For example, if the radial offset is +20 tracks, then the second track can be determined by first identifying the first track (e.g., the $100^{th}$ track), and applying the radial offset to the first track to obtain the second track (e.g., the $120^{th}$ track). As another example, if the radial offset is −20 tracks, then applying the radial offset to the first track would yield the $80^{th}$ track as the second track.

Once the second track is determined, a second spiral set may be written or launched from the second track (808). When the first spiral set and the second spiral set are written, servo information may be written using both the first spiral set and the second spiral set (810). In some implementations, when the first spiral set and the second spiral set have reached an end of the band, the writing of a new spiral band (e.g., a band that includes a third spiral set and a fourth spiral set) may be initiated near or at the end of the previous band. This process may repeat until the whole disk is written with all necessary final servo information.

In some implementations, operations 802-810 may be performed in the order listed, in parallel (e.g., by the same or a different process, substantially or otherwise non-serially), or another order to achieve the same result. In some implementations, operations 802-810 may be performed out of the order shown. For example, process 800 may first determine a radial offset with respect to a first track (804) prior to writing a first spiral set (802). Also, the order in which the operations are performed may depend, at least in part, on what entity performs the method. Operations 802-810 further may be performed by the same or different entities or systems.

Example Implementations of Hard Disk Drive

Figure 9:
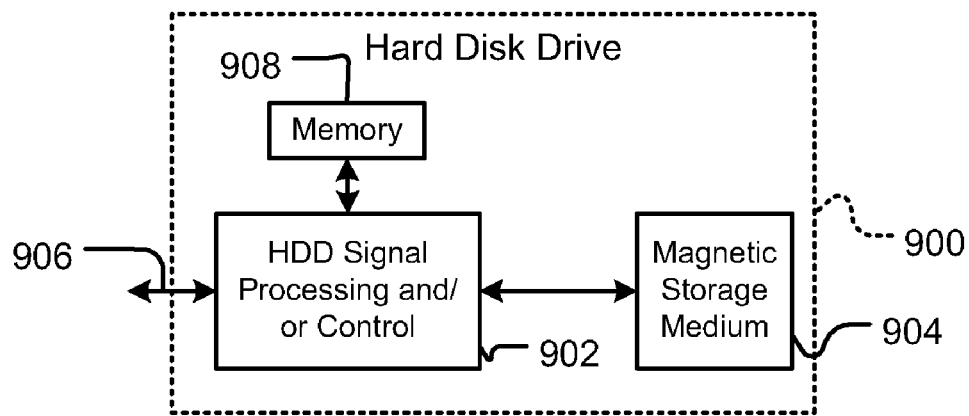
FIGS. 9-15 show various example electronic systems implementing a hard disk drive system.
Like reference symbols in the various drawings indicate like elements.

FIGS. 9-15 show various example implementations of the described systems and techniques. Referring now to FIG. 9, the described systems and techniques can be implemented in a hard disk drive (HDD) 900. The described systems and techniques may be implemented in either or both signal processing and/or control circuits, which are generally identified in FIG. 9 as 902. In some implementations, the signal processing and/or control circuit 902 and/or other circuits (not shown) in the HDD 900 may process data, perform coding and/or encryption, perform calculations, and/or format data that is output to and/or received from a magnetic storage medium 904.

The HDD 900 may communicate with a host device (not shown) such as a computer, mobile computing devices such as personal digital assistants, cellular phones, media or MP3 players and the like, and/or other devices via one or more wired or wireless communication links 906. The HDD 900 may be connected to memory 908 such as random access memory (RAM), low latency nonvolatile memory such as flash memory, read only memory (ROM) and/or other suitable electronic data storage.

Figure 10:
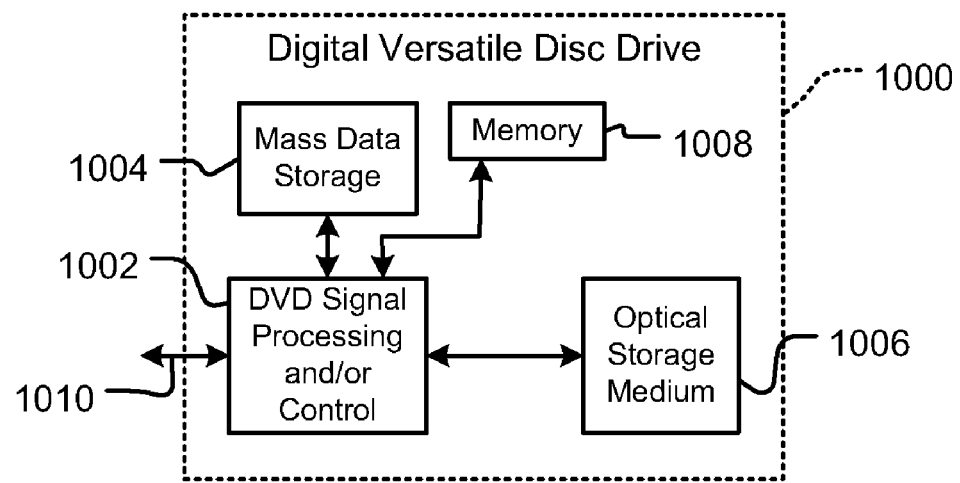

Referring now to FIG. 10, the described systems and techniques can be implemented in a digital versatile disc (DVD) drive 1000. The described systems and techniques may be implemented in either or both signal processing and/or control circuits, which are generally identified in FIG. 10 as 1002, and/or mass data storage 1004 of the DVD drive 1000. The signal processing and/or control circuit 1002 and/or other circuits (not shown) in the DVD drive 1000 may process data, perform coding and/or encryption, perform calculations, and/or format data that is read from and/or data written to an optical storage medium 1006. In some implementations, the signal processing and/or control circuit 1002 and/or other circuits (not shown) in the DVD drive 1000 can also perform other functions such as encoding and/or decoding and/or any other signal processing functions associated with a DVD drive.

The DVD drive 1000 may communicate with an output device (not shown) such as a computer, television or other device via one or more wired or wireless communication links 1010. The DVD drive 1000 may communicate with mass data storage 1004 that stores data in a nonvolatile manner. The mass data storage 1004 may include a hard disk drive (HDD). The HDD may have the configuration shown in FIG. 9. The HDD may be a mini HDD that includes one or more platters having a diameter that is smaller than approximately 1.8". The DVD drive 1000 may be connected to memory 1008 such as RAM, ROM, low latency nonvolatile memory such as flash memory and/or other suitable electronic data storage.

Figure 11:
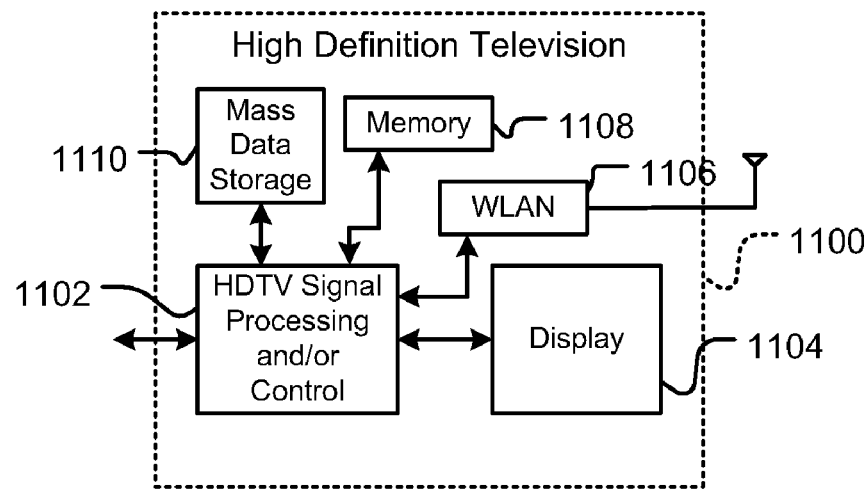

Referring now to FIG. 11, the described systems and techniques can be implemented in a high definition television (HDTV) 1100. The described systems and techniques may be implemented in either or both signal processing and/or control circuits, which are generally identified in FIG. 11 as 1102, a WLAN interface 1106 and/or mass data storage 1110 of the HDTV 1100. The HDTV 1100 receives HDTV input signals in either a wired or wireless format and generates HDTV output signals for a display 1104. In some implementations, signal processing circuit and/or control circuit 1102 and/or other circuits (not shown) of the HDTV 1100 may process data, perform coding and/or encryption, perform calculations, format data and/or perform any other type of HDTV processing that may be required.

The HDTV 1100 may communicate with mass data storage 1110 that stores data in a nonvolatile manner such as optical and/or magnetic storage devices, for example, hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The HDTV 1100 may be connected to memory 1108 such as RAM, ROM, low latency nonvolatile memory such as flash memory and/or other suitable electronic data storage. The HDTV 1100 also may support connections with a WLAN via a WLAN network interface 1106.

Figure 12:
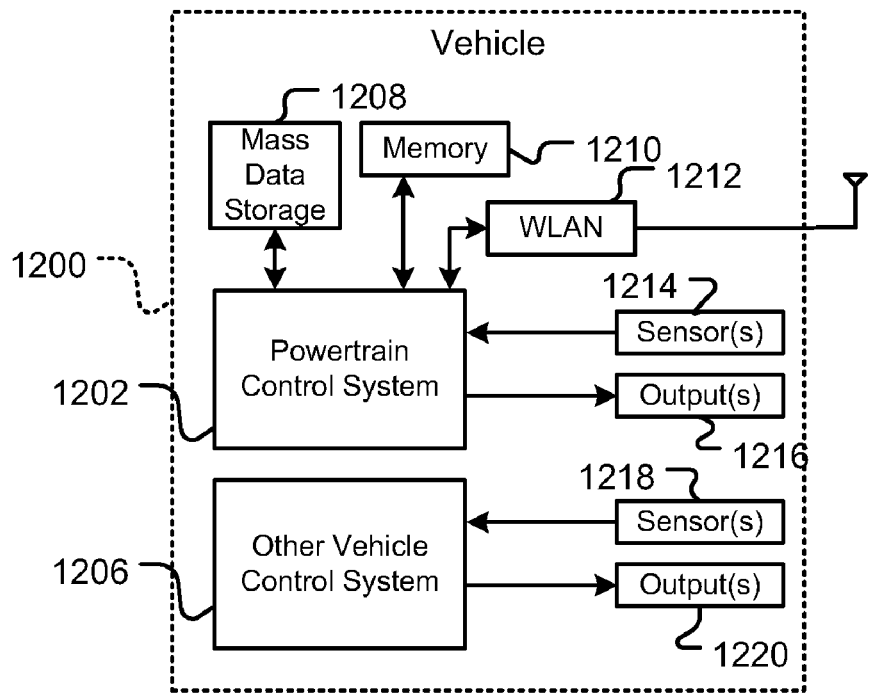

Referring now to FIG. 12, the described systems and techniques may be implemented in a control system of a vehicle 1200, a WLAN interface 1212 and/or mass data storage 1208 of the vehicle control system 1200. In some implementations, the described systems and techniques may be implemented in a powertrain control system 1202 that receives inputs from one or more sensors 1214 such as temperature sensors, pressure sensors, rotational sensors, airflow sensors and/or any other suitable sensors and/or that generates one or more output control signals such as engine operating parameters, transmission operating parameters, braking parameters and/or other control signals to one or more output devices 1216.

The described systems and techniques may also be implemented in other control systems 1206 of the vehicle 1200. The control system 1206 may likewise receive signals from input sensors 1218 and/or output control signals to one or more output devices 1220. In some implementations, the control system 1206 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1202 may communicate with mass data storage 1208 that stores data in a nonvolatile manner. The mass data storage 1208 may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The powertrain control system 1202 may be connected to memory 1210 such as RAM, ROM, low latency nonvolatile memory such as flash memory and/or other suitable electronic data storage. The powertrain control system 1202 also may support connections with a WLAN via a WLAN interface 1212. The control system 1206 may also include mass data storage, memory and/or a WLAN interface (all not shown).

Figure 13:
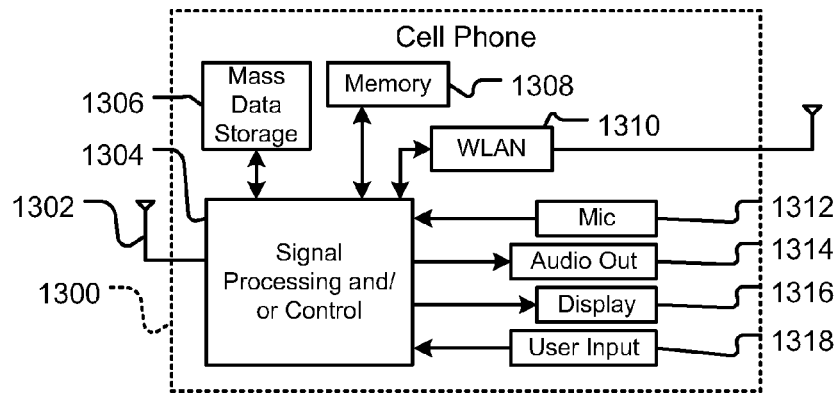

Referring now to FIG. 13, the described systems and techniques can be implemented in a cellular phone 1300 that may include a cellular antenna 1302. The described systems and techniques may be implemented in either or both signal processing and/or control circuits, which are generally identified in FIG. 13 as 1304, a WLAN interface 1310 and/or mass data storage 1306 of the cellular phone 1300. In some implementations, the cellular phone 1300 includes a microphone 1312, an audio output 1314 such as a speaker and/or audio output jack, a display 1316 and/or an input device 1318 such as a keypad, pointing device, voice actuation and/or other input device. The signal processing and/or control circuits 1304 and/or other circuits (not shown) in the cellular phone 1300 may process data, perform coding and/or encryption, perform calculations, format data and/or perform other cellular phone functions.

The cellular phone 1300 may communicate with mass data storage 1306 that stores data in a nonvolatile manner such as optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The cellular phone 1300 may be connected to memory 1308 such as RAM, ROM, low latency nonvolatile memory such as flash memory and/or other suitable electronic data storage. The cellular phone 1300 also may support connections with a WLAN via a WLAN interface 1310.

Figure 14:
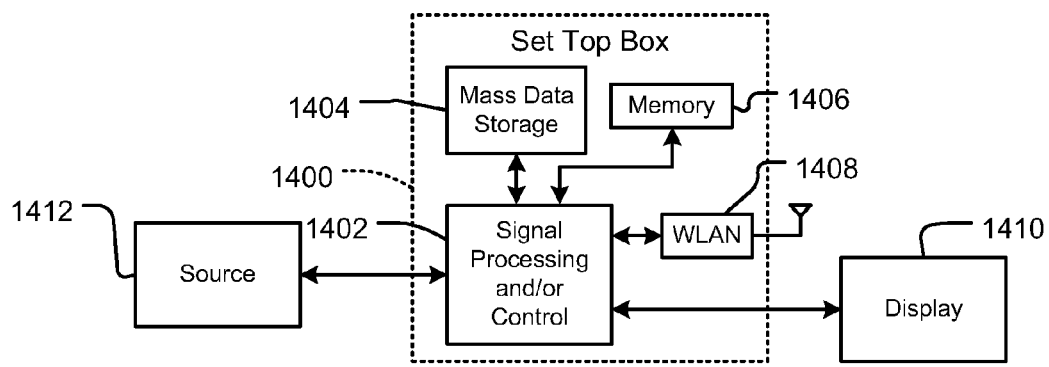

Referring now to FIG. 14, the described systems and techniques can be implemented in a set top box 1400. The described systems and techniques may be implemented in either or both signal processing and/or control circuits, which are generally identified in FIG. 14 as 1402, a WLAN interface 1408 and/or mass data storage 1404 of the set top box 1400. The set top box 1400 receives signals from a source 1412 such as a broadband source and outputs standard and/or high definition audio/video signals suitable for a display 1410 such as a television and/or monitor and/or other video and/or audio output devices. The signal processing and/or control circuits 1402 and/or other circuits (not shown) of the set top box 1400 may process data, perform coding and/or encryption, perform calculations, format data and/or perform any other set top box function.

The set top box 1400 may communicate with mass data storage 1404 that stores data in a nonvolatile manner. The mass data storage 1404 may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The set top box 1400 may be connected to memory 1406 such as RAM, ROM, low latency nonvolatile memory such as flash memory and/or other suitable electronic data storage. The set top box 1400 also may support connections with a WLAN via a WLAN interface 1408.

Figure 15:
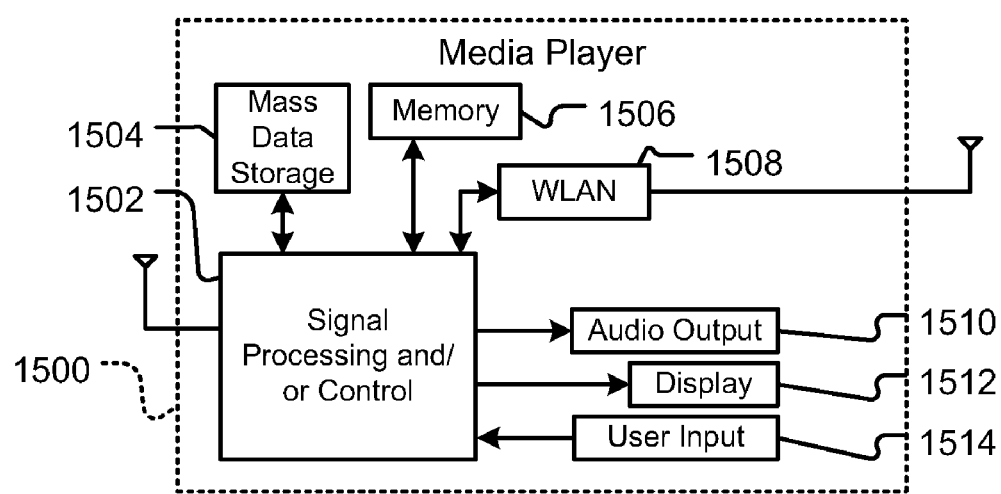

Referring now to FIG. 15, the described systems and techniques can be implemented in a media player 1500. The described systems and techniques may be implemented in either or both signal processing and/or control circuits, which are generally identified in FIG. 15 as 1502, a WLAN interface 1508 and/or mass data storage 1504 of the media player 1500. In some implementations, the media player 1500 includes a display 1512 and/or a user input 1514 such as a keypad, touchpad and the like. In some implementations, the media player 1500 may employ a graphical user interface (GUI) that typically employs menus, drop down menus, icons and/or a point-and-click interface via the display 1512 and/or user input 1514. The media player 1500 further includes an audio output 1510 such as a speaker and/or audio output jack. The signal processing and/or control circuits 1502 and/or other circuits (not shown) of the media player 1500 may process data, perform coding and/or encryption, perform calculations, format data and/or perform any other media player function.

The media player 1500 may communicate with mass data storage 1504 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 9 and/or at least one DVD drive may have the configuration shown in FIG. 10. The HDD may be a mini HDD that includes one or more platters having a diameter that is smaller than approximately 1.8". The media player 1500 may be connected to memory 1506 such as RAM, ROM, low latency nonvolatile memory such as flash memory and/or other suitable electronic data storage. The media player 1500 also may support connections with a WLAN via a WLAN interface 1508. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
    writing a first spiral set starting at a first track;
    determining a radial offset;
    determining a second track based on the radial offset;
    writing a second spiral set starting at the second track;
    determining a spiral set-to-wedge ratio based on a number of spiral sets to be written; and
    writing servo information using the first spiral set and the second spiral set, the servo information including one or more sets of servo wedges;
    where writing the one or more sets of servo wedges is based on the spiral set-to-wedge ratio; and
    where the radial offset corresponds to a radial distance measured along a radial line of a circular storage disk having an inner diameter and an outer diameter corresponding respectively to inner-most and outer-most radial locations at which concentric tracks are written to the circular storage disk, and determining a second track comprises determining the second track with respect to the first track to effect a predefined circumferential position of the second spiral set relative to the first spiral set after writing the first and second spiral sets to the circular storage disk.

2. The method of claim 1, where writing a first spiral set includes writing one or more first reference spirals, and where writing a second spiral set includes writing one or more second reference spirals different from the first reference spirals.

3. The method of claim 2, where writing one or more first reference spirals includes writing one or more first reference spirals each having a first predetermined spiral-to-spiral spacing, and where writing one or more second reference spirals includes writing one or more second reference spirals each having a second predetermined spiral-to-spiral spacing.

4. The method of claim 2, where writing one or more first reference spirals includes writing one or more first reference spirals each having a first predetermined spiral slope, and where writing one or more second reference spirals includes writing one or more second reference spirals each having a second predetermined spiral slope.

5. The method of claim 2, where writing one or more first reference spirals includes writing at least one of the first reference spirals between the second reference spirals.

6. The method of claim 1, where the radial offset is a first radial offset, the method further comprising:
   determining a second radial offset;
   determining a third track based on the second radial offset; and
   writing a third spiral set starting at the third track, the third spiral set having one or more third reference spirals,
   where writing servo information using the first spiral set and the second spiral set includes where writing servo information using the first spiral set, the second spiral set and the third spiral set.

7. The method of claim 6, where writing a third spiral set starting at the third track includes writing the third spiral set starting at the third track different from the first track or the second track.

8. The method of claim 6, where determining a second radial offset includes:
   determining a number of first reference spirals, second reference spirals and third reference spirals associated with each set of servo wedges;
   determining a spiral velocity associated with writing the first spiral set, the second spiral set and the third spiral set; and
   determining the second radial offset based on the determined number and spiral velocity.

9. The method of claim 1, further comprising writing a plurality of spiral sets including the first spiral set and the second spiral set,
   where writing the one or more sets of servo wedges based on the spiral set-to-wedge ratio includes writing one set of servo wedges for every two spiral sets of the plurality of spiral sets.

10. The method of claim 1, further comprising writing a plurality of spiral sets including the first spiral set and the second spiral set,
    where writing the one or more sets of servo wedges based on the spiral set-to-wedge ratio includes writing more spiral sets than servo wedges.

11. A method comprising:
    writing a first spiral set starting at a first track;
    determining a radial offset;
    determining a second track based on the radial offset;
    writing a second spiral set starting at the second track; and
    writing servo information using the first spiral set and the second spiral set, the servo information including one or more sets of servo wedges;
    where writing a first spiral set includes writing one or more first reference spirals, where writing a second spiral set includes writing one or more second reference spirals different from the first reference spirals, and where determining a radial offset includes:
       determining a number of first reference spirals and second reference spirals associated with each set of servo wedges;
       determining a spiral velocity associated with writing the first spiral set and the second spiral set; and
       determining the radial offset based on the determined number and spiral velocity.

12. The method of claim 11, where writing servo information includes writing the servo information at a same sample rate as one of the first spiral set or the second spiral set.

13. The method of claim 11, where writing a second spiral set starting at the second track includes writing the spiral set starting at the second track different from the first track.

14. A method comprising:
    writing a first spiral set starting at a first track;
    writing a second spiral set starting at a second track different from a first track including:
       determining a radial offset using the first track, and
       determining the second track based on the radial offset;
    determining a spiral set-to-wedge ratio based on a number of spiral sets to be written; and
    writing servo information using the first spiral set and the second spiral set;
       where writing the one or more sets of servo wedges is based on the spiral set-to-wedge ratio; and
       where the radial offset corresponds to a radial distance measured along a radial line of a circular storage disk having an inner diameter and an outer diameter corresponding respectively to inner-most and outer-most radial locations at which concentric tracks are written to the circular storage disk, and determining a second track comprises determining the second track with respect to the first track to effect a predefined circumferential position of the second spiral set relative to the first spiral set after writing the first and second spiral sets to the circular storage disk.

15. The method of claim 14, where writing a second spiral set starting at a second track includes writing the second spiral set starting at a second track earlier than writing the first spiral set starting at the first track.

16. The method of claim 14, where writing a second spiral set starting at a second track different from a first track includes writing the second spiral set starting at a second track closer to the inner diameter than the first track.

17. A system comprising:
    a processor;
    a computer-readable medium operatively coupled to the processor and including instructions, which, when executed by the processor, causes the processor to perform operations comprising:
    writing a first spiral set starting at a first track;
    determining a first radial offset;
    determining a second track based on the first radial offset;
    writing a second spiral set starting at the second track;
    determining a spiral set-to-wedge ratio based on a number of spiral sets to be written; and
    writing servo information using the first spiral set and the second spiral set, the servo information including one or more sets of servo wedges;
    where writing the one or more sets of servo wedges is based on the spiral set-to-wedge ratio; and
    where the radial offset corresponds to a radial distance measured along a radial line of a circular storage disk having an inner diameter and an outer diameter corresponding respectively to inner-most and outer-most radial locations at which concentric tracks are written to the circular storage disk, and determining a second track comprises determining the second track with respect to the first track to effect a predefined circumferential position of the second spiral set relative to the first spiral set after writing the first and second spiral sets to the circular storage disk.

* * * * *